US010891573B2

(12) United States Patent
Foubert et al.

(10) Patent No.: US 10,891,573 B2
(45) Date of Patent: Jan. 12, 2021

(54) WELLSITE REPORT SYSTEM

(71) Applicant: Schlumberger Technology Corporation, Sugar Land, TX (US)

(72) Inventors: Benoit Foubert, Katy, TX (US); Richard John Meehan, Katy, TX (US); Jean-Pierre Poyet, Houston, TX (US); Sandra Reyes, Katy, TX (US); Raymond Lin, Sugar Land, TX (US); Sylvain Chambon, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 218 days.

(21) Appl. No.: 15/566,110

(22) PCT Filed: Apr. 18, 2016

(86) PCT No.: PCT/US2016/028091
§ 371 (c)(1),
(2) Date: Oct. 12, 2017

(87) PCT Pub. No.: WO2016/172038
PCT Pub. Date: Oct. 27, 2016

(65) Prior Publication Data
US 2018/0114158 A1  Apr. 26, 2018

Related U.S. Application Data

(60) Provisional application No. 62/149,620, filed on Apr. 19, 2015.

(51) Int. Cl.
*G06Q 10/06* (2012.01)
*G06Q 10/10* (2012.01)
(Continued)

(52) U.S. Cl.
CPC ......... *G06Q 10/0633* (2013.01); *E21B 41/00* (2013.01); *E21B 44/00* (2013.01);
(Continued)

(58) Field of Classification Search
None
See application file for complete search history.

(56) References Cited

U.S. PATENT DOCUMENTS 7,181,399 B1 * 2/2007 Rahim .................. G10L 15/142
704/256.1
7,437,295 B2 * 10/2008 Pitts, III ................. G06Q 10/06
704/275
(Continued)

FOREIGN PATENT DOCUMENTS

| WO | WO0077685 A2 | 12/2000 |
| WO | WO2013074095 A1 | 5/2013 |
| WO | WO2015054155 A1 | 4/2015 |

OTHER PUBLICATIONS

International Search Report and Written Opinion issued in PCT application PCT/US2016/028091, dated Jul. 26, 2016. 15 pages.

*Primary Examiner* — Sujay Koneru
(74) *Attorney, Agent, or Firm* — Alec J. McGinn

(57) ABSTRACT

A method can include receiving state information for a wellsite system; receiving contextual information for a role associated with a workflow; generating a natural language report based at least in part on the state information and based at least in part on the contextual information; and transmitting the natural language report via a network interface based at least in part on an identifier associated with the role.

19 Claims, 18 Drawing Sheets

(51) Int. Cl.
  *G06Q 50/26* (2012.01)
  *G06F 40/40* (2020.01)
  *E21B 41/00* (2006.01)
  *E21B 44/00* (2006.01)
(52) U.S. Cl.
  CPC ........... *G06Q 10/109* (2013.01); *G06F 40/40* (2020.01); *G06Q 50/26* (2013.01)

(56) References Cited

U.S. PATENT DOCUMENTS

| | | | | |
|---|---|---|---|---|
| 7,761,885 | B2* | 7/2010 | Labrou | G06F 9/465 715/700 |
| 7,953,587 | B2* | 5/2011 | Bratton | E21B 41/00 703/10 |
| 8,606,734 | B2 | 12/2013 | Du Castel et al. | |
| 8,812,334 | B2* | 8/2014 | Givens | G06Q 10/06312 705/7.11 |
| 9,070,172 | B2* | 6/2015 | Broussard | G06Q 10/06314 |
| 9,244,894 | B1* | 1/2016 | Dale | G06F 17/2235 |
| 10,190,403 | B2* | 1/2019 | Samuel | E21B 47/002 |
| 2006/0184473 | A1* | 8/2006 | Eder | G06N 5/022 706/20 |
| 2007/0050191 | A1* | 3/2007 | Weider | G10L 15/22 704/275 |
| 2008/0037724 | A1* | 2/2008 | Hernandez | G06Q 10/08 379/88.12 |
| 2008/0172272 | A1* | 7/2008 | Back | G06Q 10/06 705/7.36 |
| 2008/0256096 | A1* | 10/2008 | Nuthakki | G06Q 20/108 |
| 2008/0262802 | A1* | 10/2008 | Halabe | E21B 43/00 703/1 |
| 2010/0114493 | A1* | 5/2010 | Vestal | E21B 44/00 702/9 |
| 2010/0121861 | A1* | 5/2010 | Marsden | G06Q 50/02 707/752 |
| 2010/0155138 | A1* | 6/2010 | Kuckes | G01V 3/24 175/45 |
| 2010/0211410 | A1* | 8/2010 | Hood | A61K 31/4415 705/3 |
| 2011/0035208 | A1* | 2/2011 | Hale | G06F 40/242 704/9 |
| 2011/0042143 | A1* | 2/2011 | Auranen | E21B 47/09 175/58 |
| 2011/0071819 | A1* | 3/2011 | Miller | G06F 17/273 704/9 |
| 2011/0166789 | A1* | 7/2011 | Barrow | G06N 5/022 702/6 |
| 2011/0174541 | A1* | 7/2011 | Strachan | E21B 44/00 175/27 |
| 2011/0246181 | A1* | 10/2011 | Liang | G06F 16/93 704/9 |
| 2011/0257839 | A1* | 10/2011 | Mukherjee | G10L 15/26 701/33.4 |
| 2012/0176251 | A1* | 7/2012 | Klass | E21B 44/00 340/854.6 |
| 2013/0140037 | A1* | 6/2013 | Sequeira, Jr. | E21B 7/04 166/369 |
| 2013/0226945 | A1* | 8/2013 | Swinson | G06F 16/90344 707/758 |
| 2013/0289988 | A1* | 10/2013 | Fry | G10L 15/19 704/239 |
| 2014/0000964 | A1* | 1/2014 | Selman | E21B 44/00 175/24 |
| 2014/0013199 | A1* | 1/2014 | Buurman | G06F 19/321 715/226 |
| 2014/0025703 | A1* | 1/2014 | Samuels | G06F 16/2452 707/769 |
| 2014/0148808 | A1* | 5/2014 | Inkpen | G01B 7/003 606/80 |
| 2014/0181128 | A1* | 6/2014 | Riskin | G06F 16/3344 707/756 |
| 2014/0351183 | A1* | 11/2014 | Germain | G06F 17/5009 706/12 |
| 2014/0357961 | A1* | 12/2014 | Meltzer | A61B 5/0002 600/301 |
| 2015/0032366 | A1* | 1/2015 | Man | G08G 1/096741 701/412 |
| 2015/0292894 | A1* | 10/2015 | Goddard | G01C 21/3453 701/400 |
| 2015/0300151 | A1* | 10/2015 | Mohaghegh | E21B 41/0007 702/9 |
| 2016/0018548 | A1* | 1/2016 | McCafferty | G01V 1/40 367/7 |
| 2016/0027125 | A1* | 1/2016 | Bryce | G06Q 40/12 705/30 |
| 2016/0146973 | A1* | 5/2016 | Johnson | G01V 1/306 702/2 |
| 2016/0163078 | A1* | 6/2016 | Germain | G01V 1/003 715/209 |

* cited by examiner

WELLSITE REPORT SYSTEM

RELATED APPLICATIONS

This application claims priority to and the benefit of a U.S. Provisional Application having Ser. No. 62/149,620, filed 19 Apr. 2015, which is incorporated by reference herein.

BACKGROUND

A bore can be drilled into a geologic environment where the bore may be utilized to form a well. A rig may be a system of components that can be operated to form a bore in a geologic environment, to transport equipment into and out of a bore in a geologic environment, etc. As an example, a rig may include a system that can be used to drill a bore and to acquire information about a geologic environment, drilling, etc. As an example, a rig can include one or more of the following components and/or equipment: a mud tank, a mud pump, a derrick or a mast, drawworks, a rotary table or a top drive, a drillstring, power generation equipment and auxiliary equipment. As an example, an offshore rig may include one or more of such components, which may be on a vessel or a drilling platform.

SUMMARY

A method can include receiving state information for a wellsite system; receiving contextual information for a role associated with a workflow; generating a natural language report based at least in part on the state information and based at least in part on the contextual information; and transmitting the natural language report via a network interface based at least in part on an identifier associated with the role. A system can include one or more processors; a network interface operatively coupled to the one or more processors; memory operatively coupled to the one or more processors; and processor-executable instructions stored in the memory and executable by at least one of the processors to instruct the system to receive state information for a wellsite system; receive contextual information for a role associated with a workflow; generate a natural language report based at least in part on the state information and based at least in part on the contextual information; and transmit the natural language report via the network interface based at least in part on an identifier associated with the role. One or more computer-readable storage media can include computer-executable instructions executable to instruct a computing system to: receive state information for a wellsite system; receive contextual information for a role associated with a workflow; generate a natural language report based at least in part on the state information and based at least in part on the contextual information; and transmit the natural language report via the network interface based at least in part on an identifier associated with the role. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Well planning is a process by which a path of a well can be mapped, so as to reach a reservoir, for example, to produce fluids therefrom. As an example, constraints can be imposed on a design of a well, for example, a well trajectory may be constrained via one or more physical phenomena that may impact viability of a bore, ease of drilling, etc. Thus, for example, one or more constraints may be imposed based at least in part on known geology of a subterranean domain or, for example, presence of other wells in the area (e.g., collision avoidance). As an example, one or more other constraints may be imposed, for example, consider one or more constraints germane to capabilities of tools being used and/or one or more constraints related to drilling time and risk tolerance.

As an example, a well plan can be generated based at least in part on imposed constraints and known information. As an example, a well plan may be provided to a well owner, approved, and then implemented by a drilling service provider (e.g., a directional driller or "DD").

As an example, a well design system can account for one or more capabilities of a drilling system or drilling systems that may be utilized at a wellsite. As an example, a drilling engineer may be called upon to take such capabilities into account, for example, as one or more of various designs and specifications are created.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

Figure 1:
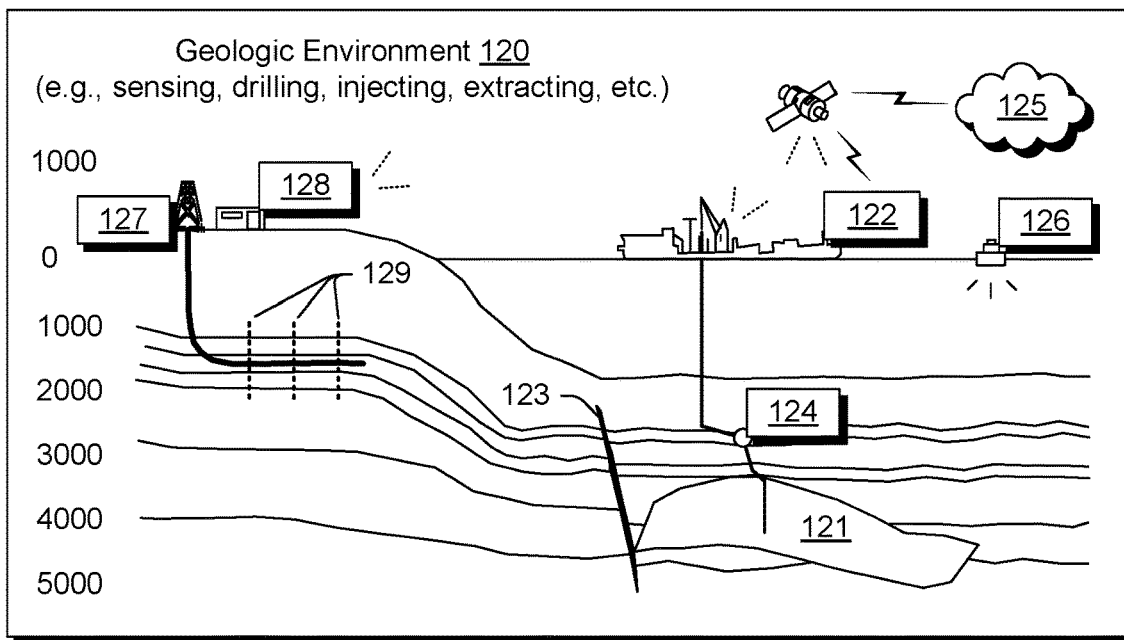
FIG. 1 illustrates examples of equipment in a geologic environment.
Figure 1:
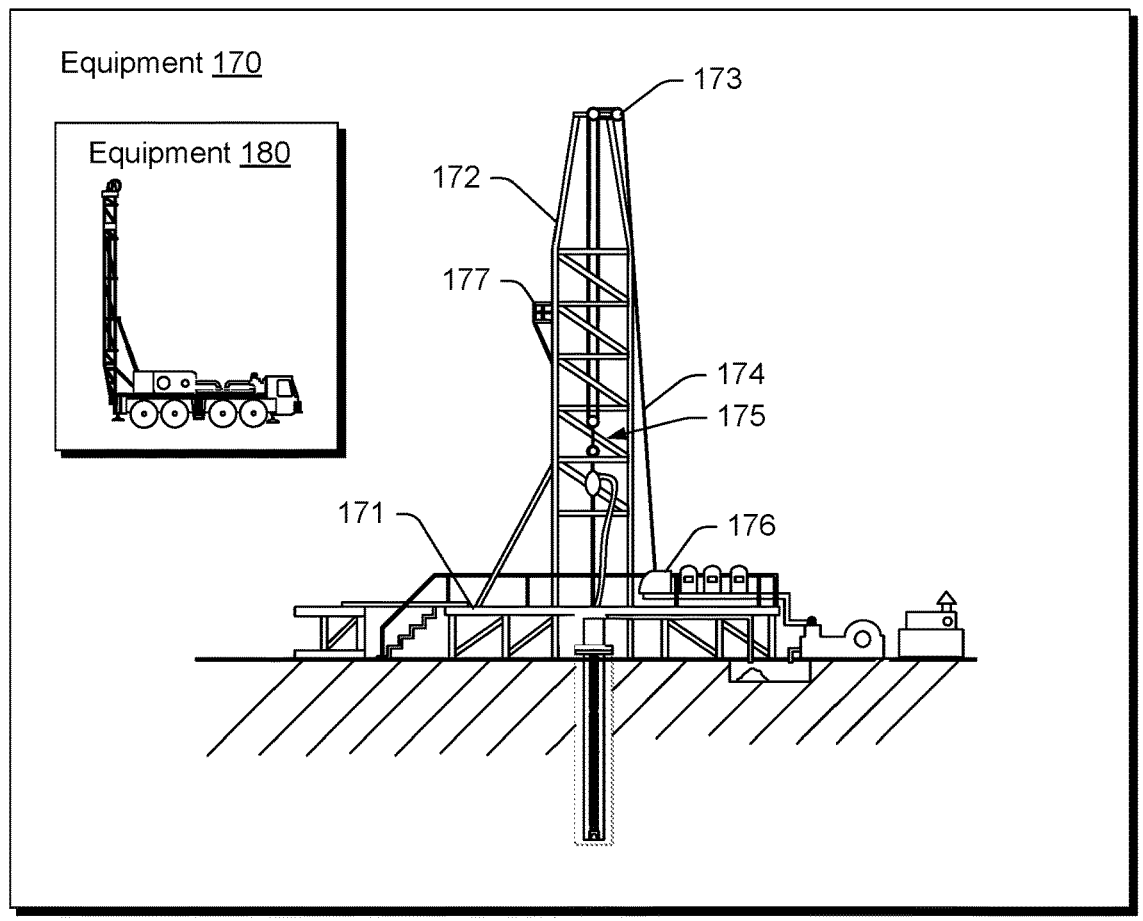

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
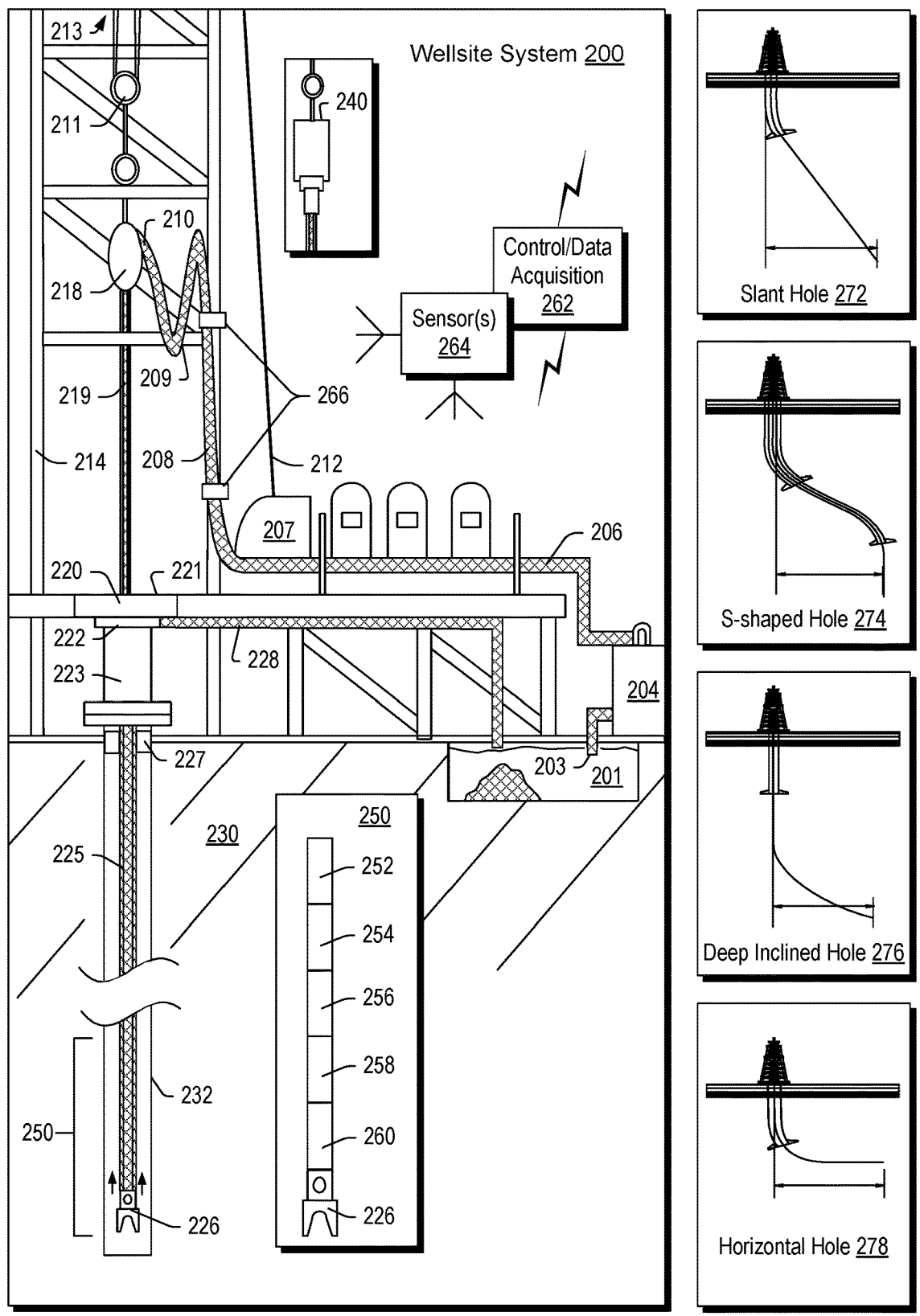
FIG. 2 illustrates an example of a system and examples of types of holes.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (AND) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
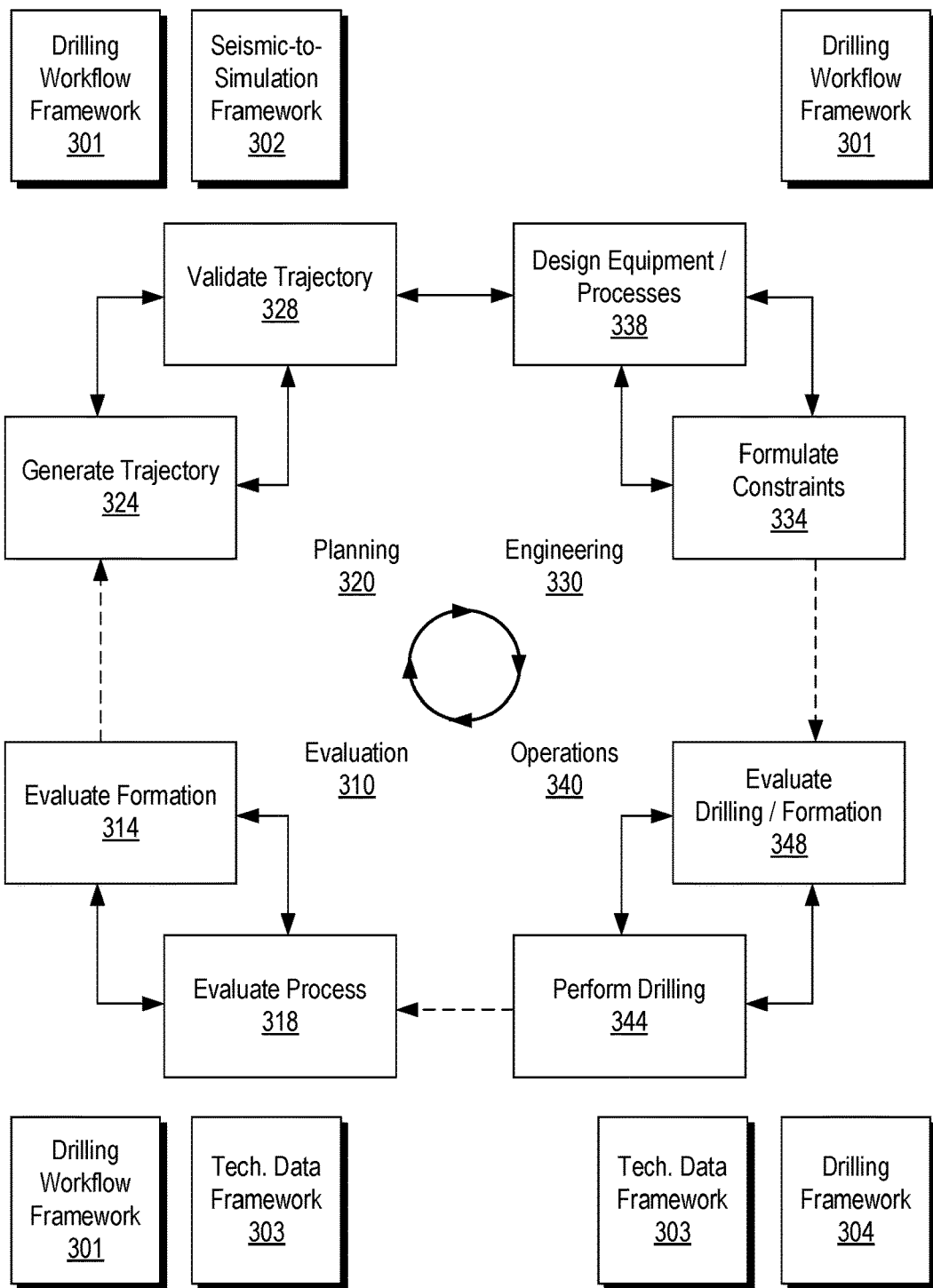
FIG. 3 illustrates an example of a system.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL® framework (Schlumberger Limited, Houston, Tex.) and the technical data framework 303 can be, for example, the TECHLOG® framework (Schlumberger Limited, Houston, Tex.).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. A commercially available example of an object-based framework is the MICROSOFT™ .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

As an example, a framework can include an analysis component that may allow for interaction with a model or model-based results (e.g., simulation results, etc.). As to simulation, a framework may operatively link to or include a simulator such as the ECLIPSE® reservoir simulator (Schlumberger Limited, Houston Tex.), the INTERSECT® reservoir simulator (Schlumberger Limited, Houston Tex.), etc.

The aforementioned PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As an example, one or more frameworks may be interoperative and/or run upon one or another. As an example, consider the commercially available framework environment marketed as the OCEAN® framework environment (Schlumberger Limited, Houston, Tex.), which allows for integration of add-ons (or plug-ins) into a PETREL® framework workflow. The OCEAN® framework environment leverages .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. The framework may include the commercially available OCEAN® framework where the model simulation layer can include or operatively link to the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

As an example, the model simulation layer may provide domain objects, act as a data source, provide for rendering and provide for various user interfaces. Rendering may provide a graphical environment in which applications can display their data while the user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL® software, for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA® framework, marketed by Schlumberger Limited, Houston, Tex.) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL® framework, etc.).

As an example, a workflow may be a process implementable at least in part in the OCEAN® framework. As an example, a workflow may include one or more worksteps that access a module such as a plug-in (e.g., external executable code, etc.).

As an example, a framework may provide for modeling petroleum systems. For example, the commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

Figure 4:
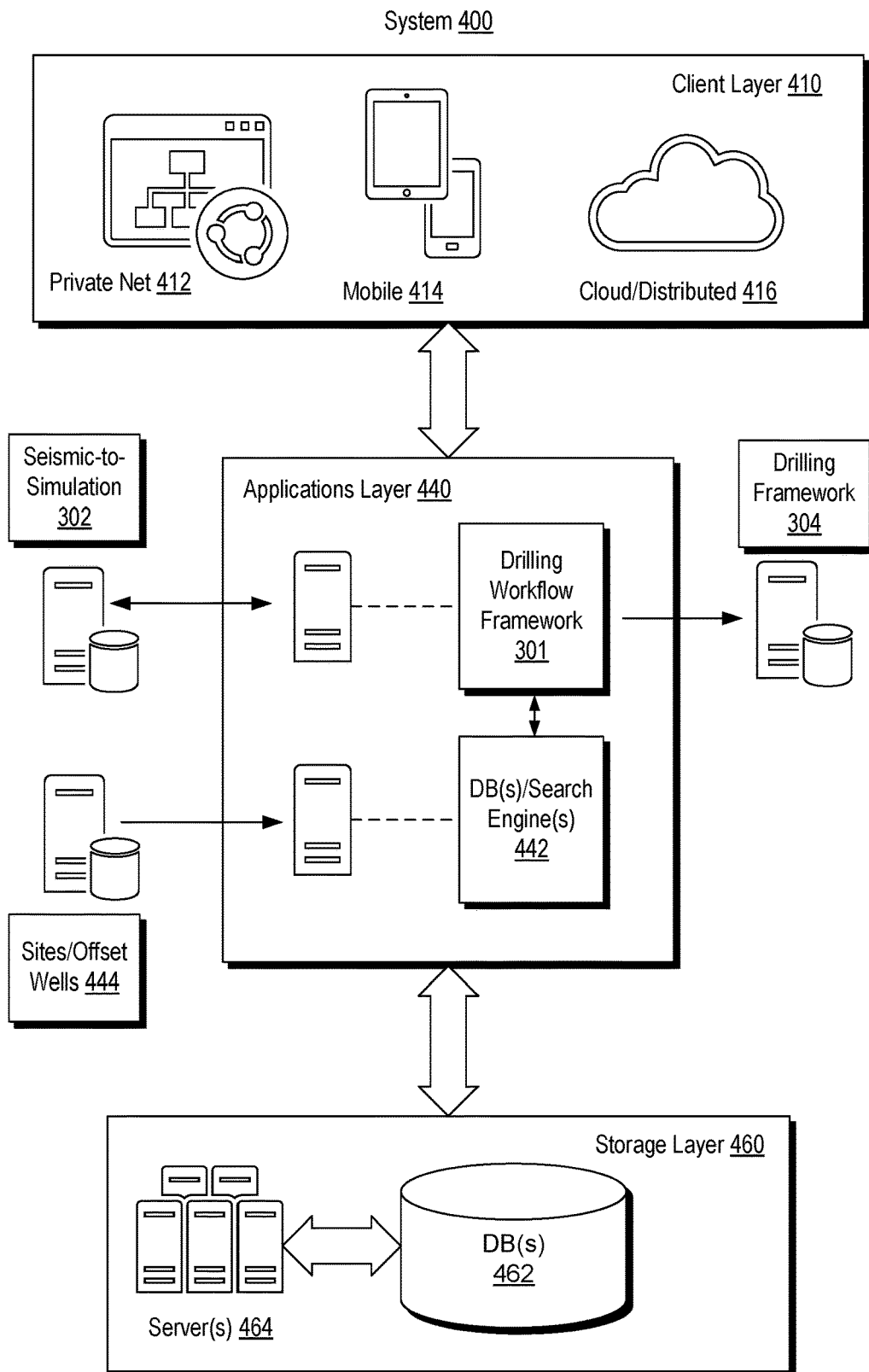
FIG. 4 illustrates an example of a system.

FIG. 4 shows an example of a system 400 that includes a client layer 410, an applications layer 440 and a storage layer 460. As shown the client layer 410 can be in communication with the applications layer 440 and the applications layer 440 can be in communication with the storage layer 460.

The client layer 410 can include features that allow for access and interactions via one or more private networks 412, one or more mobile platforms and/or mobile networks 414 and via the "cloud" 416, which may be considered to include distributed equipment that forms a network such as a network of networks.

In the example of FIG. 4, the applications layer 440 includes the drilling workflow framework 301 as mentioned with respect to the example of FIG. 3. The applications layer 440 also includes a database management component 442 that includes one or more search engines modules.

As an example, the database management component 442 can include one or more search engine modules that provide for searching one or more information that may be stored in one or more data repositories. As an example, the STUDIO E&P™ knowledge environment (Schlumberger Ltd., Houston, Tex.) includes STUDIO FIND™ search functionality, which provides a search engine. The STUDIO FIND™ search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND™ search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 4, the applications layer 440 can include communicating with one or more resources such as, for example, the seismic-to-simulation framework 302, the drilling framework 304 and/or one or more sites, which may be or include one or more offset wellsites. As an example, the applications layer 440 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 4, the storage layer 460 can include various types of data, information, etc., which may be stored in one or more databases 462. As an example, one or more servers 464 may provide for management, access, etc., to data, information, etc., stored in the one or more databases 462. As an example, the module 442 may provide for searching as to data, information, etc., stored in the one or more databases 462.

As an example, the module 442 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 400 of FIG. 4 may be implemented to perform one or more portions of one or more workflows associated with the system 300 of FIG. 3. For example, the drilling workflow framework 301 may interact with the technical data framework 303 and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

Figure 5:
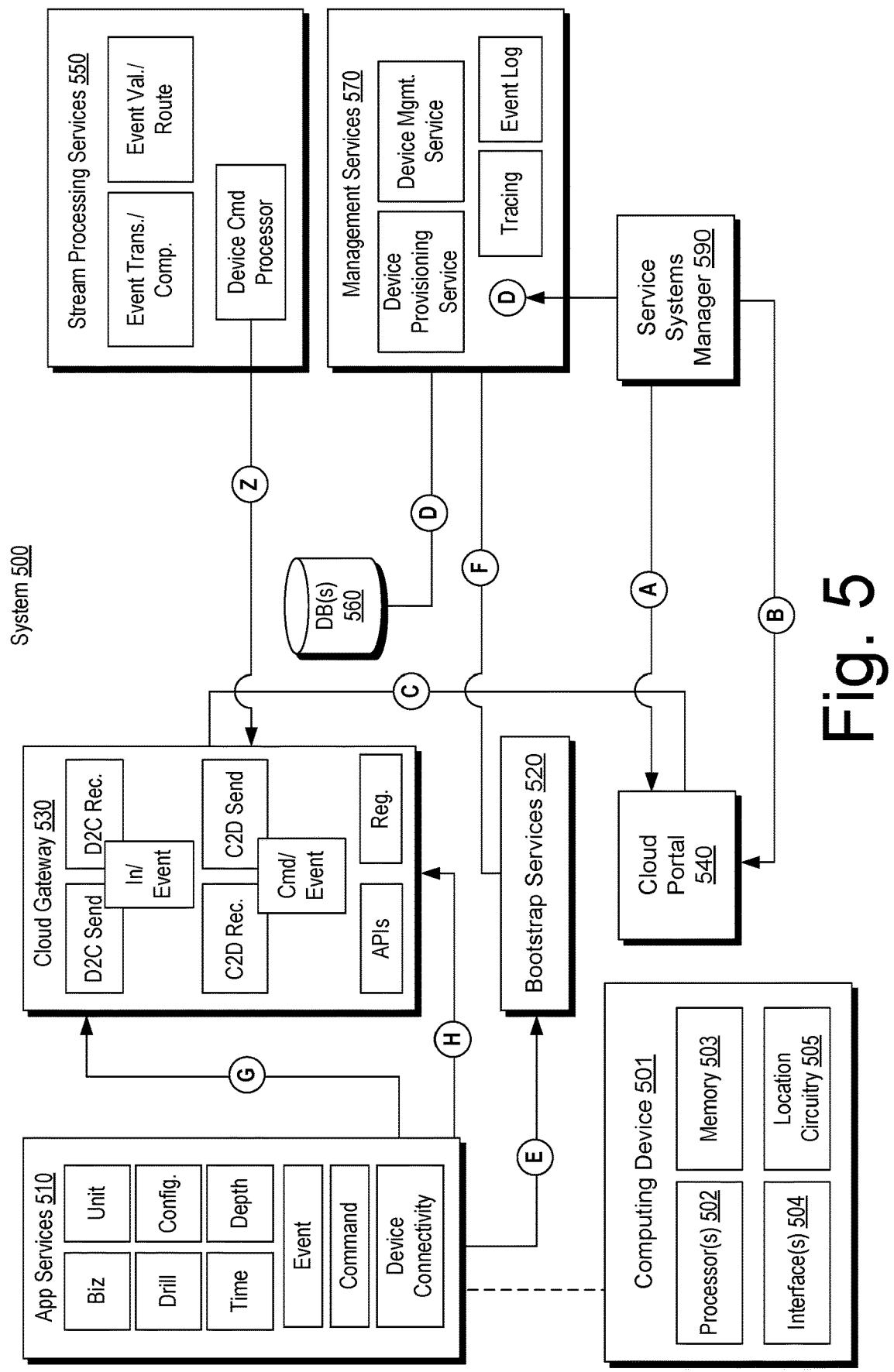
FIG. 5 illustrates an example of a system.

FIG. 5 shows an example of a system 500 that includes a computing device 501, an application services block 510, a bootstrap services block 520, a cloud gateway block 530, a cloud portal block 540, a stream processing services block 550, one or more databases 560, a management services block 570 and a service systems manager 590.

In the example of FIG. 5, the computing device 501 can include one or more processors 502, memory 503, one or more interfaces 504 and location circuitry 505 or, for example, one of the one or more interfaces 504 may be operatively coupled to location circuitry that can acquire local location information. For example, the computing device 501 can include GPS circuitry as location circuitry such that the approximate location of the computer device 501 can be determined. While GPS is mentioned (Global Positioning System), location circuitry may employ one or more types of locating techniques. For example, consider one or more of GLONASS, GALILEO, BeiDou-2, or another system (e.g., global navigation satellite system, "GNSS"). As an example, location circuitry may include cellular phone circuitry (e.g., LTE, 3G, 4G, etc.). As an example, location circuitry may include WiFi circuitry.

As an example, the application services block 510 can be implemented via instructions executable using the computing device 501. As an example, the computing device 501 may be at a wellsite and part of wellsite equipment. As an example, the computing device 501 may be a mobile computing device (e.g., tablet, laptop, etc.) or a desktop computing device that may be mobile, for example, as part of wellsite equipment (e.g., doghouse equipment, rig equipment, vehicle equipment, etc.).

As an example, the system 500 can include performing various actions. For example, the system 500 may include a token that is utilized as a security measure to assure that information (e.g., data) is associated with appropriate permission or permissions for transmission, storage, access, etc.

In the example of FIG. 5, various circles are shown with labels A to H. As an example, A can be a process where an administrator creates a shared access policy (e.g., manually, via an API, etc.); B can be a process for allocating a shared access key for a device identifier (e.g., a device ID), which may be performed manually, via an API, etc.); C can be a process for creating a "device" that can be registered in a device registry and for allocating a symmetric key; D can be a process for persisting metadata where such metadata may be associated with a wellsite identifier (e.g., a well ID) and where, for example, location information (e.g., GPS based information, etc.) may be associated with a device ID and a well ID; E can be a process where a bootstrap message passes that includes a device ID (e.g., a trusted platform module (TPM) chip ID that may be embedded within a device) and that includes a well ID and location information such that bootstrap services (e.g., of the bootstrap services block 520) can proceed to obtain shared access signature (SAS) key(s) to a cloud service endpoint for authorization; F can be a process for provisioning a device, for example, if not already provisioned, where, for example, the process can include returning device keys and endpoint; G can be a process for getting a SAS token using an identifier and a key; and H can be a process that includes being ready to send a message using device credentials. Also shown in FIG. 5 is a process for getting a token and issuing a command for a well identifier (see label Z).

As an example, Shared Access Signatures can be an authentication mechanism based on, for example, SHA-256 secure hashes, URIs, etc. As an example, SAS may be used by one or more Service Bus services. SAS can be implemented via a Shared Access Policy and a Shared Access Signature, which may be referred to as a token. As an example, for SAS applications using the AZURE™ .NET SDK with the Service Bus, .NET libraries can use SAS authorization through the SharedAccessSignatureTokenProvider class.

As an example, where a system gives an entity (e.g., a sender, a client, etc.) a SAS token, that entity does not have the key directly, and that entity cannot reverse the hash to obtain it. As such, there is control over what that entity can access and, for example, for how long access may exist. As an example, in SAS, for a change of the primary key in the policy, Shared Access Signatures created from it will be invalidated.

As an example, the system 500 of FIG. 5 can be implemented for provisioning of rig acquisition system and/or data delivery.

As an example, a method can include establishing an Internet of Things (IoT) hub or hubs. As an example, such a hub or hubs can include one or more device registries. In such an example, the hub or hubs may provide for storage of metadata associated with a device and, for example, a per-device authentication model. As an example, where location information indicates that a device (e.g., wellsite equipment, etc.) has been changed with respect to its location, a method can include revoking the device in a hub.

As an example, such an architecture utilized in a system such as, for example, the system 500, may include features of the AZURE™ architecture (Microsoft Corporation, Redmond, Wash.). As an example, the cloud portal block 540 can include one or more features of an AZURE™ portal that can manage, mediate, etc. access to one or more services, data, connections, networks, devices, etc.

As an example, the system 500 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 6:
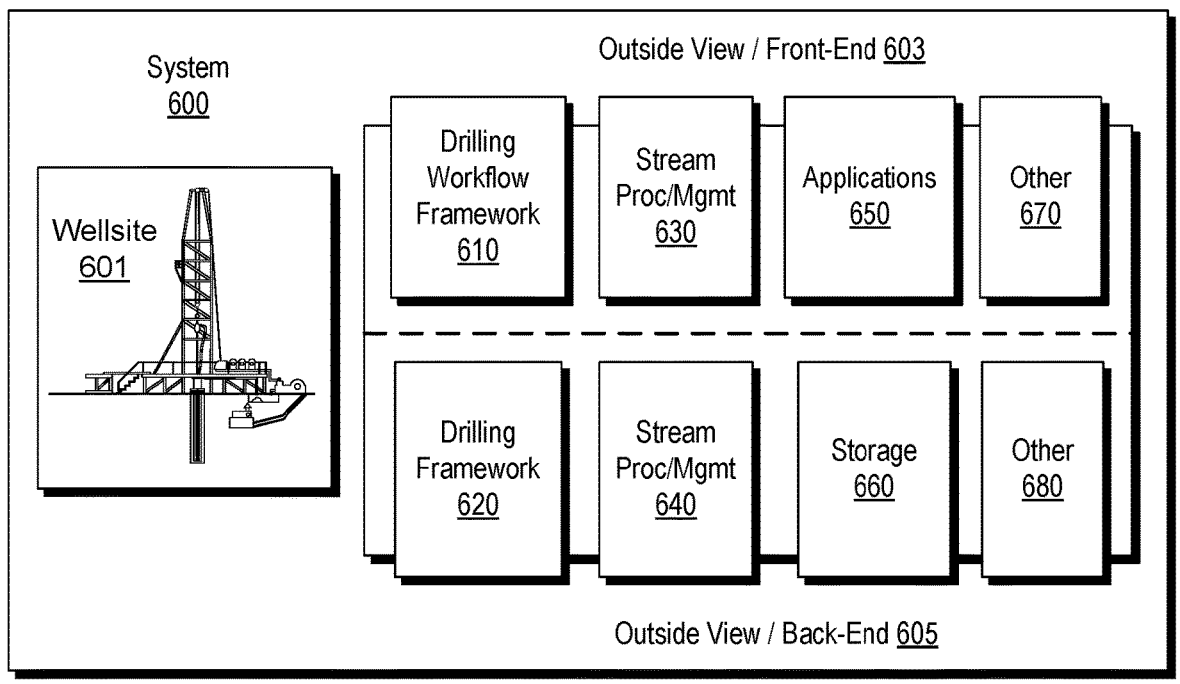
FIG. 6 illustrates an example of a system and an example of a scenario.
Figure 6:
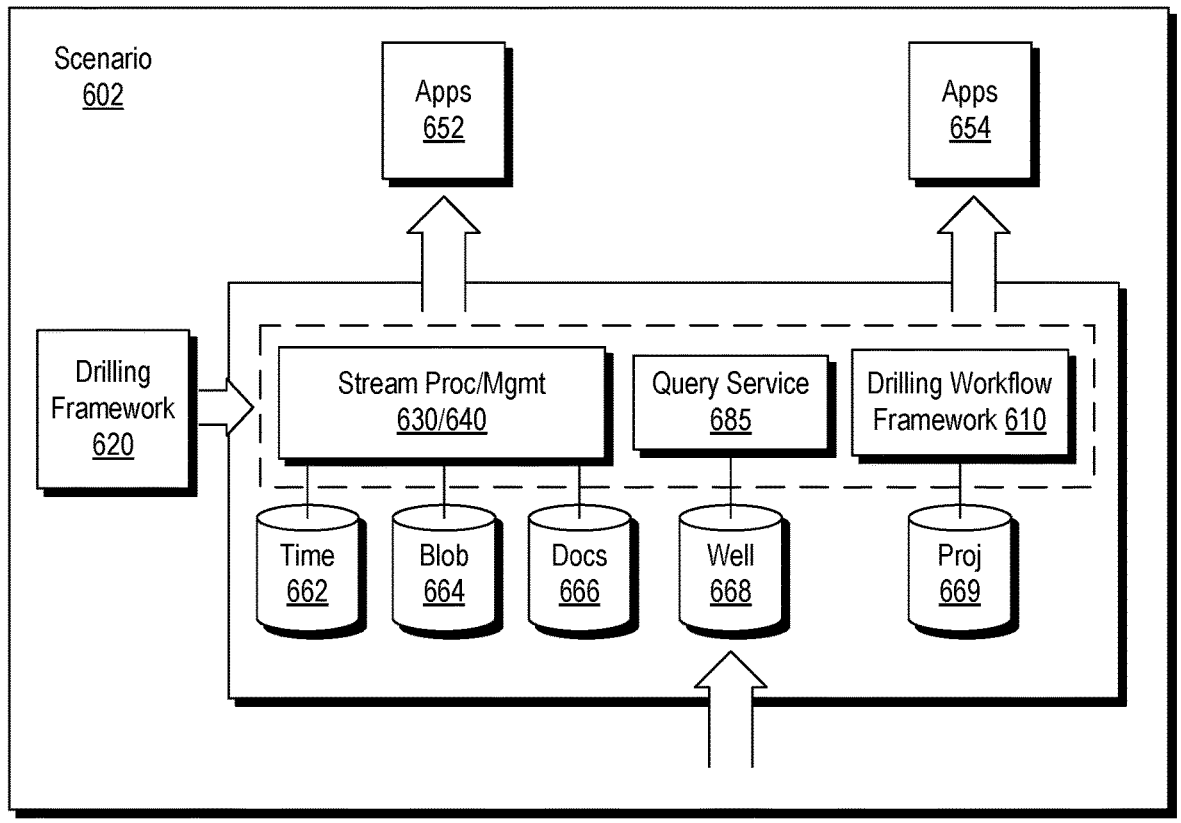

FIG. 6 shows an example of a system 600 associated with an example of a wellsite system 601 and also shows an example scenario 602. As shown in FIG. 6, the system 600 can include a front-end 603 and a back-end 605 from an outside or external perspective (e.g., external to the wellsite system 601, etc.). In the example of FIG. 6, the system 600 includes a drilling framework 620, a stream processing and/or management block 640, storage 660 and optionally one or more other features that can be defined as being back-end features. In the example of FIG. 6, the system 600 includes a drilling workflow framework 610, a stream processing and/or management block 630, applications 650 and optionally one or more other features that can be defined as being front-end features.

As an example, a user operating a user device can interact with the front-end 603 where the front-end 603 can interact with one or more features of the back-end 605. As an example, such interactions may be implemented via one or more networks, which may be associated with a cloud platform (e.g., cloud resources, etc.).

As to the example scenario 602, the drilling framework 620 can provide information associated with, for example, the wellsite system 601. As shown, the stream blocks 630 and 640, a query service 685 and the drilling workflow framework 610 may receive information and direct such information to storage, which may include a time series database 662, a blob storage database 664, a document database 666, a well information database 668, a project(s) database 669, etc. As an example, the well information database 668 may receive and store information such as, for example, customer information (e.g., from entities that may be owners of rights at a wellsite, service providers at a wellsite, etc.). As an example, the project database 669 can include information from a plurality of projects where a project may be, for example, a wellsite project.

As an example, the system 600 can be operable for a plurality of wellsites, which may include active and/or inactive wellsites and/or, for example, one or more planned wellsites. As an example, the system 600 can include various components of the system 300 of FIG. 3. As an example, the system 600 can include various components of the system 400 of FIG. 4. For example, the drilling workflow framework 610 can be a drilling workflow framework such as the drilling workflow framework 301 and/or, for example, the drilling framework 620 can be a drilling framework such as the drilling framework 304.

Figure 7:
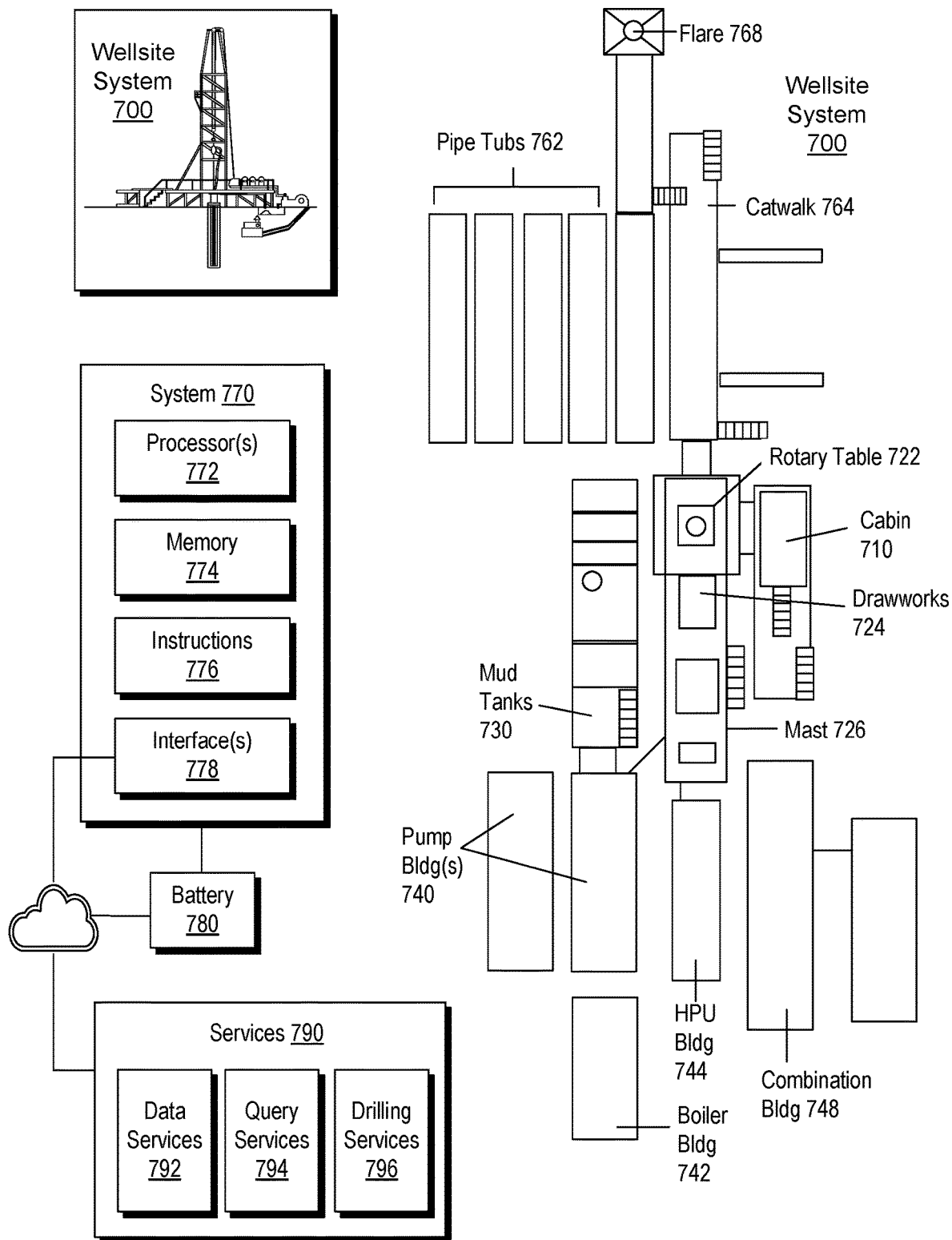
FIG. 7 illustrates an example of a wellsite system.

FIG. 7 shows an example of a wellsite system 700, specifically, FIG. 7 shows the wellsite system 700 in an approximate side view and an approximate plan view along with a block diagram of a system 770.

In the example of FIG. 7, the wellsite system 700 can include a cabin 710, a rotary table 722, drawworks 724, a mast 726 (e.g., optionally carrying a top drive, etc.), mud tanks 730 (e.g., with one or more pumps, one or more shakers, etc.), one or more pump buildings 740, a boiler building 742, an HPU building 744 (e.g., with a rig fuel tank, etc.), a combination building 748 (e.g., with one or more generators, etc.), pipe tubs 762, a catwalk 764, a flare 768, etc. Such equipment can include one or more associated functions and/or one or more associated operational risks, which may be risks as to time, resources, and/or humans.

As shown in the example of FIG. 7, the wellsite system 700 can include a system 770 that includes one or more processors 772, memory 774 operatively coupled to at least one of the one or more processors 772, instructions 776 that can be, for example, stored in the memory 774, and one or more interfaces 778. As an example, the system 770 can include one or more processor-readable media that include processor-executable instructions executable by at least one of the one or more processors 772 to cause the system 770 to control one or more aspects of the wellsite system 700. In such an example, the memory 774 can be or include the one or more processor-readable media where the processor-executable instructions can be or include instructions. As an example, a processor-readable medium can be a computer-readable storage medium that is not a signal and that is not a carrier wave.

FIG. 7 also shows a battery 780 that may be operatively coupled to the system 770, for example, to power the system 770. As an example, the battery 780 may be a back-up battery that operates when another power supply is unavailable for powering the system 770. As an example, the battery 780 may be operatively coupled to a network, which may be a cloud network. As an example, the battery 780 can include smart battery circuitry and may be operatively coupled to one or more pieces of equipment via a SMBus or other type of bus.

In the example of FIG. 7, services 790 are shown as being available, for example, via a cloud platform. Such services can include data services 792, query services 794 and drilling services 796. As an example, the services 790 may be part of a system such as the system 300 of FIG. 3, the system 400 of FIG. 4 and/or the system 600 of FIG. 6.

As an example, a system such as, for example, the system 300 of FIG. 3 may be utilized to perform a workflow. Such a system may be distributed and allow for collaborative workflow interactions and may be considered to be a platform (e.g., a framework for collaborative interactions, etc.).

As an example, one or more systems can be utilized to implement a workflow that can be performed collaboratively. As an example, the system 300 of FIG. 3 can be operated as a distributed, collaborative well-planning system. The system 300 can utilize one or more servers, one or more client devices, etc. and may maintain one or more databases, data files, etc., which may be accessed and modified by one or more client devices, for example, using a web browser, remote terminal, etc. As an example, a client device may modify a database or data files on-the-fly, and/or may include "sandboxes" that may permit one or more client devices to modify at least a portion of a database or data files optionally off-line, for example, without affecting a database or data files seen by one or more other client devices. As an example, a client device that includes a sandbox may modify a database or data file after completing an activity in the sandbox.

In some examples, client devices and/or servers may be remote with respect to one another and/or may individually include two or more remote processing units. As an example, two systems can be "remote" with respect to one another if they are not physically proximate to one another; for example, two devices that are located at different sides of a room, in different rooms, in different buildings, in different cities, countries, etc. may be considered "remote" depending on the context. In some embodiments, two or more client devices may be proximate to one another, and/or one or more client devices and a server may be proximate to one another.

As an example, various aspects of a workflow may be completed automatically, may be partially automated, or may be completed manually, as by a human user interfacing with a software application. As an example, a workflow may be cyclic, and may include, as an example, four stages such as, for example, an evaluation stage (see, e.g., the evaluation equipment 310), a planning stage (see, e.g., the planning equipment 320), an engineering stage (see, e.g., the engineering equipment 330) and an execution stage (see, e.g., the operations equipment 340). As an example, a workflow may commence at one or more stages, which may progress to one or more other stages (e.g., in a serial manner, in a parallel manner, in a cyclical manner, etc.).

As an example, a workflow can commence with an evaluation stage, which may include a geological service provider evaluating a formation (see, e.g., the evaluation block 314). As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory (see, e.g., the generation block 324), which may involve execution of one or more G&G software packages. Examples of such software packages include the PETREL® framework. As an example, a G&G service provider may determine a well trajectory or a section thereof, based on, for example, one or more model(s) provided by a formation evaluation (e.g., per the evaluation block 314), and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design (see, e.g., the validation block 328). Such a validation process may include evaluating physical properties, calculations, risk tolerances, integration with other aspects of a workflow, etc. As an example, one or more parameters for such determinations may be maintained by a server and/or by the first engineering service provider; noting that one or more model (s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory (see, e.g., the design block 338). In some embodiments, a second engineering service provider may perform such design using one of more software applications. Such designs may be stored in one or more databases maintained by one or more servers, which may, for example, employ STUDIO® framework tools, and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like (see, e.g., the formulation block 334). As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters (see, e.g., the blocks 344 and 348). As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review (see, e.g., the evaluation block 318). As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in any gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

As an example, a system can allow for a reduction in waste, for example, as may be defined according to LEAN. In the context of LEAN, consider one or more of the following types of waste: Transport (e.g., moving items unnecessarily, whether physical or data); Inventory (e.g., components, whether physical or informational, as work in process, and finished product not being processed); Motion (e.g., people or equipment moving or walking unnecessarily to perform desired processing); Waiting (e.g., waiting for information, interruptions of production during shift change, etc.); Overproduction (e.g., production of material, information, equipment, etc. ahead of demand); Over Processing (e.g., resulting from poor tool or product design creating activity); and Defects (e.g., effort involved in inspecting for and fixing defects whether in a plan, data, equipment, etc.). As an example, a system that allows for actions (e.g., methods, workflows, etc.) to be performed in a collaborative manner can help to reduce one or more types of waste.

As an example, a system can be utilized to implement a method for facilitating distributed well engineering, planning, and/or drilling system design across multiple computation devices where collaboration can occur among various different users (e.g., some being local, some being remote, some being mobile, etc.). In such a system, the various users via appropriate devices may be operatively coupled via one or more networks (e.g., local and/or wide area networks, public and/or private networks, land-based, marine-based and/or areal networks, etc.).

As an example, a system may allow well engineering, planning, and/or drilling system design to take place via a subsystems approach where a wellsite system is composed of various subsystem, which can include equipment subsystems and/or operational subsystems (e.g., control subsystems, etc.). As an example, computations may be performed using various computational platforms/devices that are operatively coupled via communication links (e.g., network links, etc.). As an example, one or more links may be operatively coupled to a common database (e.g., a server site, etc.). As an example, a particular server or servers may manage receipt of notifications from one or more devices and/or issuance of notifications to one or more devices. As an example, a system may be implemented for a project where the system can output a well plan, for example, as a digital well plan, a paper well plan, a digital and paper well plan, etc. Such a well plan can be a complete well engineering plan or design for the particular project.

Figure 8:
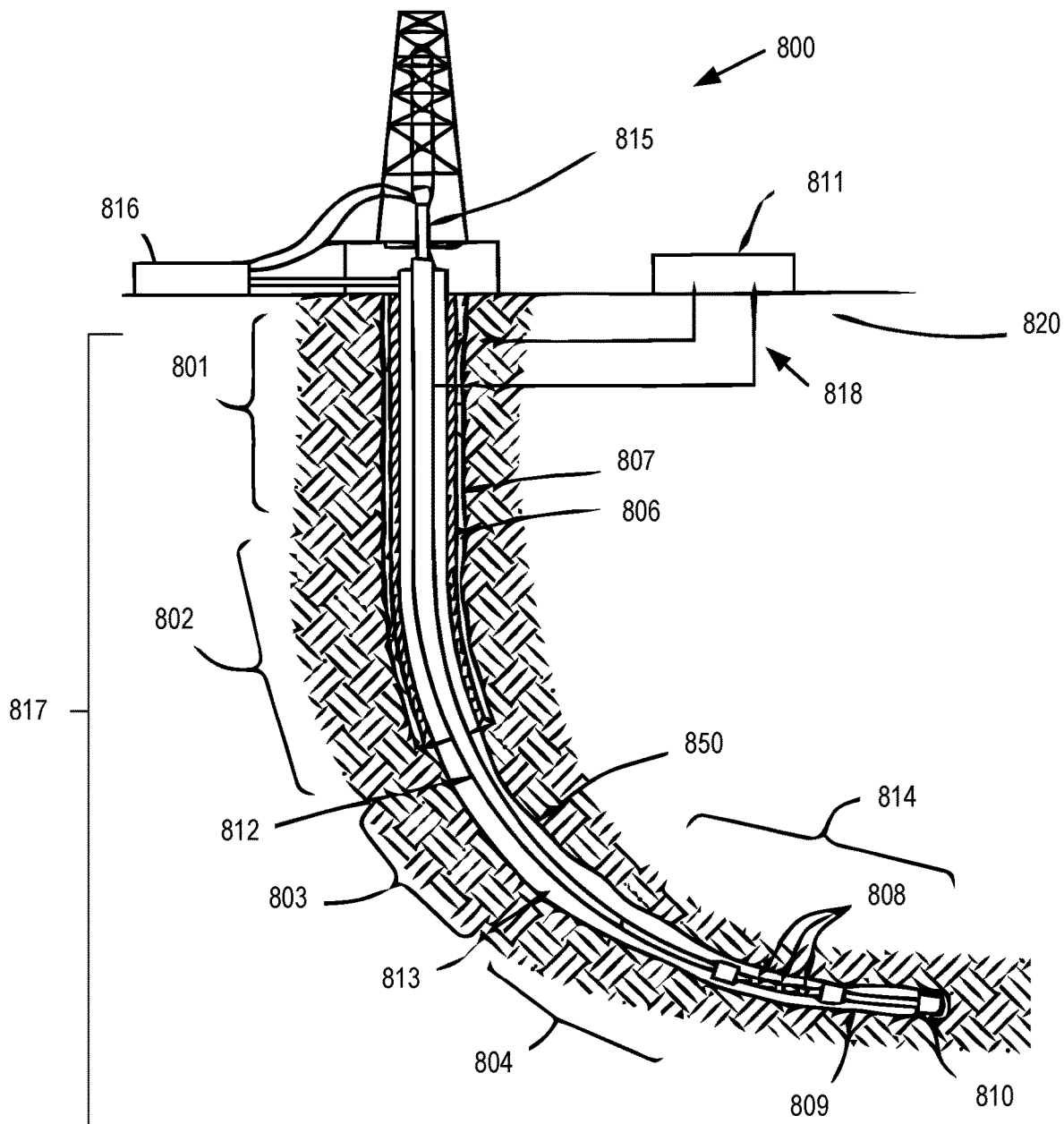
FIG. 8 illustrates an example of a system.

FIG. 8 shows a schematic diagram depicting an example of a drilling operation of a directional well in multiple sections. The drilling operation depicted in FIG. 8 includes a wellsite drilling system 800 and a field management tool 820 for managing various operations associated with drilling a bore hole 850 of a directional well 817. The wellsite drilling system 800 includes various components (e.g., drillstring 812, annulus 813, bottom hole assembly (BHA) 814, kelly 815, mud pit 816, etc.). As shown in the example of FIG. 8, a target reservoir may be located away from (as opposed to directly under) the surface location of the well 817. In such an example, special tools or techniques may be used to ensure that the path along the bore hole 850 reaches the particular location of the target reservoir.

As an example, the BHA 814 may include sensors 808, a rotary steerable system 809, and a bit 810 to direct the drilling toward the target guided by a pre-determined survey program for measuring location details in the well. Furthermore, the subterranean formation through which the directional well 817 is drilled may include multiple layers (not shown) with varying compositions, geophysical characteristics, and geological conditions. Both the drilling planning during the well design stage and the actual drilling according to the drilling plan in the drilling stage may be performed in multiple sections (e.g., sections 801, 802, 803 and 804) corresponding to the multiple layers in the subterranean formation. For example, certain sections (e.g., sections 801 and 802) may use cement 807 reinforced casing 806 due to the particular formation compositions, geophysical characteristics, and geological conditions.

In the example of FIG. 8, a surface unit 811 may be operatively linked to the wellsite drilling system 800 and the field management tool 820 via communication links 818. The surface unit 811 may be configured with functionalities to control and monitor the drilling activities by sections in real-time via the communication links 818. The field management tool 820 may be configured with functionalities to store oilfield data (e.g., historical data, actual data, surface data, subsurface data, equipment data, geological data, geophysical data, target data, anti-target data, etc.) and determine relevant factors for configuring a drilling model and generating a drilling plan. The oilfield data, the drilling model, and the drilling plan may be transmitted via the communication link 818 according to a drilling operation workflow. The communication links 818 may include a communication subassembly.

During various operations at a wellsite, data can be acquired for analysis and/or monitoring of one or more operations. Such data may include, for example, subterranean formation, equipment, historical and/or other data. Static data can relate to, for example, formation structure and geological stratigraphy that define the geological structures of the subterranean formation. Static data may also include data about a bore, such as inside diameters, outside diameters, and depths. Dynamic data can relate to, for example, fluids flowing through the geologic structures of the subterranean formation over time. The dynamic data may include, for example, pressures, fluid compositions (e.g. gas oil ratio, water cut, and/or other fluid compositional information), and states of various equipment, and other information.

The static and dynamic data collected via a bore, a formation, equipment, etc. may be used to create and/or update a three dimensional model of one or more subsurface formations. As an example, static and dynamic data from one or more other bores, fields, etc. may be used to create and/or update a three dimensional model. As an example, hardware sensors, core sampling, and well logging techniques may be used to collect data. As an example, static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once a well is formed and completed, depending on the purpose of the well (e.g., injection and/or production), fluid may flow to the surface (e.g., and/or from the surface) using tubing and other completion equipment. As fluid passes, various dynamic measurements, such as fluid flow rates, pressure, and composition may be monitored. These parameters may be used to determine various characteristics of a subterranean formation, downhole equipment, downhole operations, etc.

Figure 9:
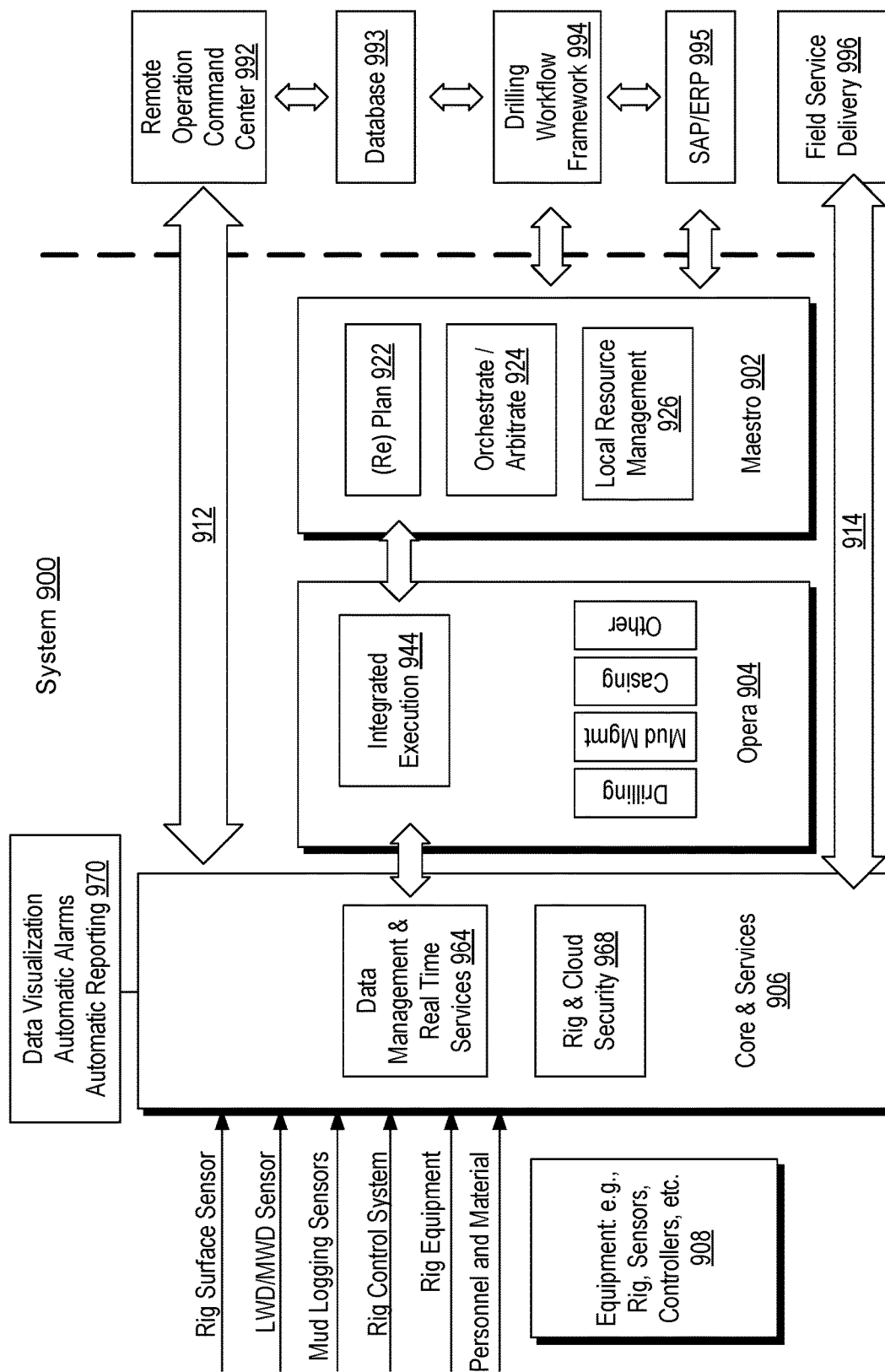
FIG. 9 illustrates an example of a system.

FIG. 9 shows an example of a system 900 that includes various components that can be local to a wellsite and includes various components that can be remote from a wellsite. As shown, the system 900 includes a Maestro block 902, an Opera block 904, a Core & Services block 906 and an Equipment block 908. These blocks can be labeled in one or more manners other than as shown in the example of FIG. 9. In the example of FIG. 9, the blocks 902, 904, 906 and 908 can be defined by one or more of operational features, functions, relationships in an architecture, etc.

As an example, the blocks 902, 904, 906 and 908 may be described in a pyramidal architecture where, from peak to base, a pyramid includes the Maestro block 902, the Opera block 904, the Core & Services block 906 and the Equipment block 908.

As an example, the Maestro block 902 can be associated with a well management level (e.g., well planning and/or orchestration) and can be associated with a rig management level (e.g., rig dynamic planning and/or orchestration). As an example, the Opera block 904 can be associated with a process management level (e.g., rig integrated execution). As an example, the Core & Services block 906 can be associated with a data management level (e.g., sensor, instrumentation, inventory, etc.). As an example, the Equipment block 908 can be associated with a wellsite equipment level (e.g., wellsite subsystems, etc.).

As an example, the Maestro block 902 may receive information from a drilling workflow framework and/or one or more other sources, which may be remote from a wellsite.

In the example of FIG. 9, the Maestro block 902 includes a plan/replan block 922, an orchestrate/arbitrate block 924 and a local resource management block 926. In the example of FIG. 9, the Opera block 904 includes an integrated execution block 944, which can include or be operatively coupled to blocks for various subsystems of a wellsite such as a drilling subsystem, a mud management subsystem (e.g., a hydraulics subsystem), a casing subsystem (e.g., casings and/or completions subsystem), and, for example, one or more other subsystems. In the example of FIG. 9, the Core & Services block 906 includes a data management and real-time services block 964 (e.g., real-time or near real-time services) and a rig and cloud security block 968 (see, e.g., the system 500 of FIG. 5 as to provisioning and various type of security measures, etc.). In the example of FIG. 9, the Equipment block 908 is shown as being capable of providing various types of information to the Core & Services block 906. For example, consider information from a rig surface sensor, a LWD/MWD sensor, a mud logging sensor, a rig control system, rig equipment, personnel, material, etc. In the example, of FIG. 9, a block 970 can provide for one or more of data visualization, automatic alarms, automatic reporting, etc. As an example, the block 970 may be operatively coupled to the Core & Services block 906 and/or one or more other blocks.

As mentioned, a portion of the system 900 can be remote from a wellsite. For example, to one side of a dashed line appear a remote operation command center block 992, a database block 993, a drilling workflow framework block 994, a SAP/ERP block 995 and a field services delivery block 996. Various blocks that may be remote can be operatively coupled to one or more blocks that may be local to a wellsite system. For example, a communication link 912 is illustrated in the example of FIG. 9 that can operatively couple the blocks 906 and 992 (e.g., as to monitoring, remote control, etc.), while another communication link 914 is illustrated in the example of FIG. 9 that can operatively couple the blocks 906 and 996 (e.g., as to equipment delivery, equipment services, etc.). Various other examples of possible communication links are also illustrated in the example of FIG. 9.

As an example, the system 900 of FIG. 9 may be a field management tool. As an example, the system 900 of FIG. 9 may include a drilling framework (see, e.g., the drilling frameworks 304 and 620). As an example, blocks in the system 900 of FIG. 9 that may be remote from a wellsite may include various features of the services 790 of FIG. 7.

As an example, a wellbore can be drilled according to a drilling plan that is established prior to drilling. Such a drilling plan, which may be a well plan or a portion thereof, can set forth equipment, pressures, trajectories and/or other parameters that define drilling process for a wellsite. As an example, a drilling operation may then be performed according to the drilling plan (e.g., well plan). As an example, as information is gathered, a drilling operation may deviate from a drilling plan. Additionally, as drilling or other operations are performed, subsurface conditions may change. Specifically, as new information is collected, sensors may transmit data to one or more surface units. As an example, a surface unit may automatically use such data to update a drilling plan (e.g., locally and/or remotely).

As an example, the drilling workflow framework 994 can be or include a G&G system and a well planning system. As an example, a G&G system corresponds to hardware, software, firmware, or a combination thereof that provides support for geology and geophysics. In other words, a geologist who understands the reservoir may decide where to drill the well using the G&G system that creates a three-dimensional model of the subsurface formation and includes simulation tools. The G&G system may transfer a well trajectory and other information selected by the geologist to a well planning system. The well planning system corresponds to hardware, software, firmware, or a combination thereof that produces a well plan. In other words, the well plan may be a high-level drilling program for the well. The well planning system may also be referred to as a well plan generator.

In the example of FIG. 9, various blocks can be components that may correspond to one or more software modules, hardware infrastructure, firmware, equipment, or any combination thereof. Communication between the components may be local or remote, direct or indirect, via application programming interfaces, and procedure calls, or through one or more communication channels.

As an example, various blocks in the system 900 of FIG. 9 can correspond to levels of granularity in controlling operations of associated with equipment and/or personnel in an oilfield. As shown in FIG. 9, the system 900 can include the Maestro block 902 (e.g., for well plan execution), the Opera block 904 (e.g., process manager collection), the Core & Services block 906, and the Equipment block 908.

The Maestro block 902 may be referred to as a well plan execution system. For example, a well plan execution system corresponds to hardware, software, firmware or a combination thereof that performs an overall coordination of the well construction process, such as coordination of a drilling rig and the management of the rig and the rig equipment. A well plan execution system may be configured to obtain the general well plan from well planning system and transform the general well plan into a detailed well plan. The detailed well plan may include a specification of the activities involved in performing an action in the general well plan, the days and/or times to perform the activities, the individual resources performing the activities, and other information.

As an example, a well plan execution system may further include functionality to monitor an execution of a well plan to track progress and dynamically adjust the plan. Further, a well plan execution system may be configured to handle logistics and resources with respect to on and off the rig. As an example, a well plan execution system may include multiple sub-components, such as a detailer that is configured to detail the well planning system plan, a monitor that is configured to monitor the execution of the plan, a plan manager that is configured to perform dynamic plan management, and a logistics and resources manager to control the logistics and resources of the well. In one or more embodiments, a well plan execution system may be configured to coordinate between the different processes managed by a process manager collection (see, e.g., the Opera block 904). In other words, a well plan execution system can communicate and manage resource sharing between processes in a process manager collection while operating at, for example, a higher level of granularity than process manager collection.

As to the Opera block 904, as mentioned, it may be referred to as a process manager collection. In one or more embodiments, a process manager collection can include functionality to perform individual process management of individual domains of an oilfield, such as a rig. For example, when drilling a well, different activities may be performed. Each activity may be controlled by an individual process manager in the process manager collection. A process manager collection may include multiple process managers, whereby each process manager controls a different activity (e.g., activity related to the rig). In other words, each process manager may have a set of tasks defined for the process manager that is particular to the type of physics involved in the activity. For example, drilling a well may use drilling mud, which is fluid pumped into well in order to extract drill cuttings from the well. A drilling mud process manager may exist in a process manager collection that manages the mixing of the drilling mud, the composition, testing of the drilling mud properties, determining whether the pressure is accurate, and performing other such tasks. The drilling mud process manager may be separate from a process manager that controls movement of drill pipe from a well. Thus, a process manager collection may partition activities into several different domains and manages each of the domains individually. Amongst other possible process managers, a process manager collection may include, for example, a drilling process manager, a mud preparation and management process manager, a casing running process manager, a cementing process manager, a rig equipment process manager, and other process managers. Further, a process manager collection may provide direct control or advice regarding the components above. As an example, coordination between process managers in a process manager collection may be performed by a well plan execution system.

As to the Core & Service block 906 (e.g., a core services block or CS block), it can include functionality to manage individual pieces of equipment and/or equipment subsystems. As an example, a CS block can include functionality to handle basic data structure of the oilfield, such as the rig, acquire metric data, produce reports, and manages resources of people and supplies. As an example, a CS block may include a data acquirer and aggregator, a rig state identifier, a real-time (RT) drill services (e.g., near real-time), a reporter, a cloud, and an inventory manager.

As an example, a data acquirer and aggregator can include functionality to interface with individual equipment components and sensor and acquire data. As an example, a data acquirer and aggregator may further include functionality to interface with sensors located at the oilfield.

As an example, a rig state identifier can includes functionality to obtain data from the data acquirer and aggregator and transform the data into state information. As an example, state information may include health and operability of a rig as well as information about a particular task being performed by equipment.

As an example, RT drill services can include functionality to transmit and present information to individuals. In particular, the RT drill services can include functionality to transmit information to individuals involved according to roles and, for example, device types of each individual (e.g., mobile, desktop, etc.). In one or more embodiments, information presented by RT drill services can be context specific, and may include a dynamic display of information so that a human user may view details about items of interest.

As an example, in one or more embodiments, a reporter can include functionality to generate reports. For example, reporting may be based on requests and/or automatic generation and may provide information about state of equipment and/or people.

As an example, a wellsite "cloud" framework can correspond to an information technology infrastructure locally at an oilfield, such as an individual rig in the oilfield. In such an example, the wellsite "cloud" framework may be an "Internet of Things" (IoT) framework. As an example, a wellsite "cloud" framework can be an edge of the cloud (e.g., a network of networks) or of a private network.

As an example, an inventory manager can be a block that includes functionality to manage materials, such as a list and amount of each resource on a rig.

In the example of FIG. 9, the Equipment block 908 can correspond to various controllers, control unit, control equipment, etc. that may be operatively coupled to and/or embedded into physical equipment at a wellsite such as, for example, rig equipment. For example, the Equipment block 908 may correspond to software and control systems for individual items on the rig. As an example, the Equipment block 908 may provide for monitoring sensors from multiple subsystems of a drilling rig and provide control commands to multiple subsystem of the drilling rig, such that sensor data from multiple subsystems may be used to provide control commands to the different subsystems of the drilling rig and/or other devices, etc. For example, a system may collect temporally and depth aligned surface data and downhole data from a drilling rig and transmit the collected data to data acquirers and aggregators in core services, which can store the collected data for access onsite at a drilling rig or offsite via a computing resource environment.

As an example, a method can include generating reports using a system such as, for example, the system 900 of FIG. 9. For example, the system 900 can include features for acquiring information about a rig, which can be state information. As an example, a system may operate automatically to determine a state or states based at least in part on information received by the system, which can include information acquired via one or more sensors, one or more devices with input mechanisms for user input, etc. As an example, a report may be generated based at least in part on a state or states (e.g., based at least in part on state information). As an example, a report may be triggered based on a push system and/or a pull system. For example, an oilfield operator may query a system to determine one or more states of the system (e.g., where a state can be a system state, a subsystem state, etc.). As an example, a report may be triggered based on state information, time, or another type of trigger.

Figure 10:
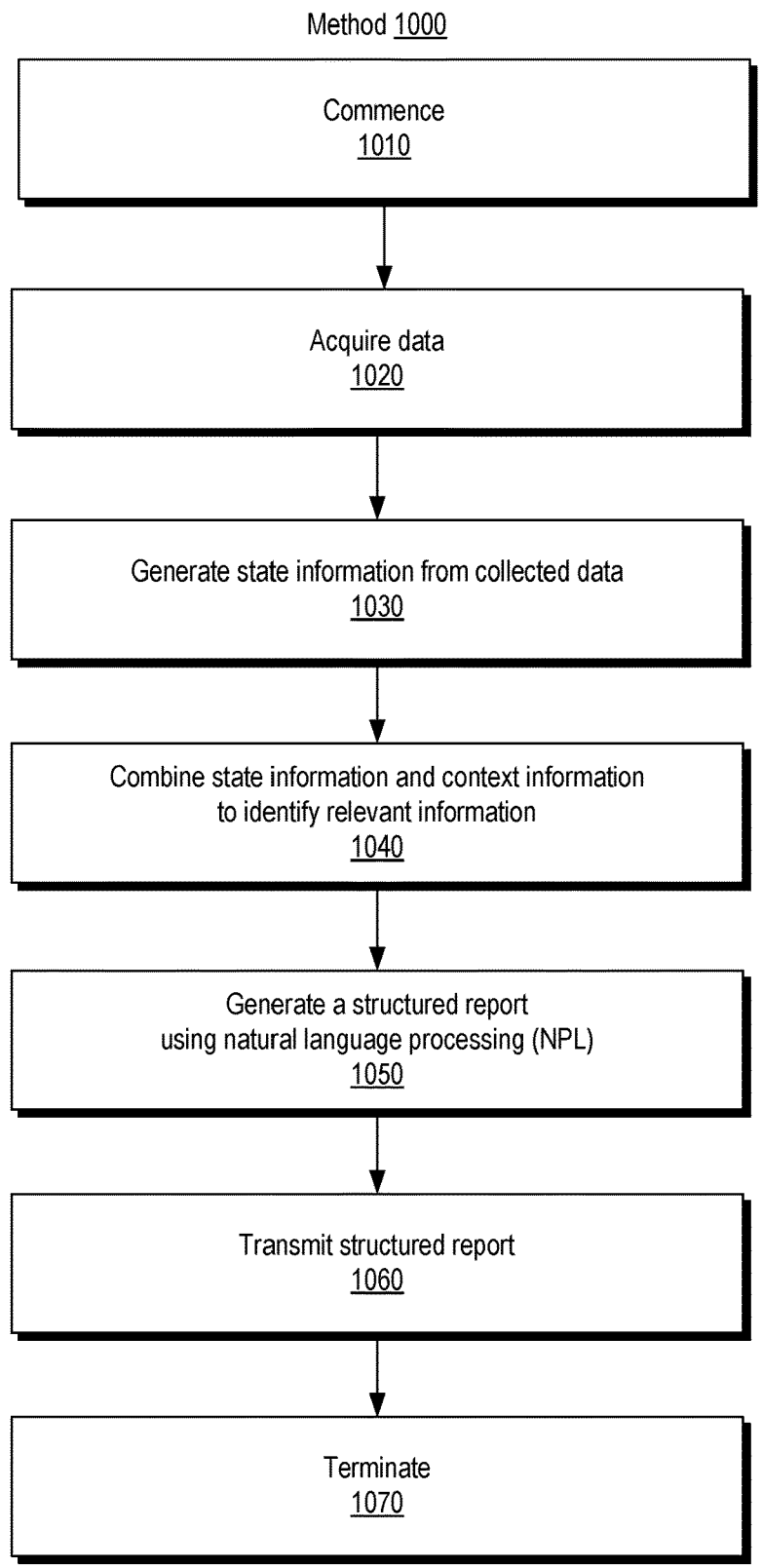
FIG. 10 illustrates an example of a method.

FIG. 10 shows an example of a method 1000 that includes a commencement block 1010 for commencing the method 1000, an acquisition block 1020 for acquiring data, a generation block 1030 for generating state information based at least in part on the acquired data, a combination block 1040 for combining at least a portion of the state information and context information to identify relevant information (e.g., as to one or more contexts), a generation block 1050 for generating a structured report using natural language processing (NLP), a transmission block 1060 for transmitting the structured report and a termination block 1070 for terminating the method 1000.

While various blocks in the example of FIG. 10 are presented and described sequentially, as an example, at least some of the blocks may be executed in different orders, may be combined or omitted, and at least some of the blocks may be executed in parallel. As an example, one or more blocks may be performed actively and/or passively. For example, some blocks may be performed using polling or be interrupt-driven.

As an example, a method for generating a report can include various blocks that perform actions automatically by a reporter associated with a core and services portion of a system such as, for example, the block 970 as associated with the Core & Services block 906 of the system 900.

As an example, a method can include a collection block where sensor data and other data are collected from various portions of an oilfield. In such an example, sensor data may be used to generate state information about various aspects of the oilfield. For example, raw sensor data gathered from a rig subsystem may be processed through one or more models to identify a state of the rig.

As an example, a method can include a combination block where state information is combined with context information to identify relevant information. For example, such context information may include various tasks or activities that are being performed, information about goals, and role of the user receiving the report. With respect to tasks or activities, the context information may include an activity model for each activity that defines the tasks in the activity. By comparing the state information to the tasks in the activity model, a reporting portion of core services (see, e.g., the blocks 906 and 970) may determine which portion of the state information is relevant. In an example embodiment, user input (e.g., user input regarding previous reports, or current user input regarding the current report), may be used to determine which portion of the state information is relevant and/or refine the activity model. Further, one or more activity models may be defined for particular roles of users. Thus, the identified relevant information can account for a user's role or roles. Thus, the context information may be used to identify state information relevant to a user, a current activity and/or tasks, and desired state or states to be achieved. As an example, state information that is deemed to be of lesser relevance (e.g., irrelevant) based on the context information may be automatically ignored.

As an example, a method can include a natural language processing block where natural language processing is performed on relevant information to generate a structured report. As an example, natural language processing can be performed based on a role or roles of a user. In such an example, a resulting structured report can include relevant information in a manner that is tailored to the role or roles of the user.

As an example, a method can include a transmission block where a report can be transmitted to one or more devices such as one or more computing devices which may be defined to be one or more user devices. For example, a report may be transmitted by obtaining stored information about a user to identify a format of the report and a device to which the report is to be transmitted (e.g., a network address, etc.). In such an example, based on the stored information, the report can be appropriately transmitted and, for example, rendered to a display (e.g., of a tablet, a smart phone, etc.). As an example, one or more portions of a system can include features that can gather incoming data and transform the incoming data into a type of content that a person using a report would want to use.

As an example, a system can include features that may perform "automated" reporting where, for example, numbers may be pulled from measured data, some basic calculations such as averaging, min/max identification, etc., performed and then a result or results inserted as processed data into a standardized template (e.g., as numbers, graphs, etc.). As an example, a system can include additionally or alternatively, features that can analyze data in a current context and dynamically generate a report using data (e.g., sensor data, etc.) and contextual information. As an example, a report may highlight one or more noteworthy events and, for example, exclude extraneous information.

As an example, a report may include various types of information. As an example, a report can be contextually generated such that, for example, state information can be utilized to generate a plurality of different reports that correspond to different contexts. As to some examples, consider a first report that may state, for example: "Drilled with a medium ROP from 1793 m to 2214 m"; a second report that may state, for example: "Drilled with 8.74" PDC bit plus directional BHA equipped with PowerDrive Archer+MWD+Neutron Density from 1793 m to 2214 m. Parameters: Flowrate: 476.4 gal/min, Rotation: 94 rpm, Pressure: 2246 psi, TORQUE: 7.2 lbs/ft and WOB: 9.7 klbs"; and a third report that may state, for example: "Drilled fourteen stands with 8.74" PDC bit plus directional BHA equipped with PowerDrive+MWD+LWD from 1793 m to 2214 m."

In the foregoing three examples, the first example report uses the depth range (1793 m-2214 m) and describes the ROP (rate of penetration) as medium. Here medium can be included as a relative term that depends on an environment being drilled and equipment used. In other contexts the same ROP may be considered to be high or low. The second example report connects sensor measurements with equipment used and highlights parameters that are relevant (e.g., noteworthy) for that equipment. The third example report represents a distance drilled in terms of stands (e.g., units of a drilling process) as well as a depth range. In these examples, the reporting style and content is tailored for a consumer of the report. The first example may be for a company that may be interested in progress of the well, but not the details of the equipment used. The second may be for a directional driller, who may be interested in the details of the BHA equipment and the parameters chosen. The third example report may be for a toolpusher who may be interested in the process of drilling and the efficiency of the rig.

Figure 11:
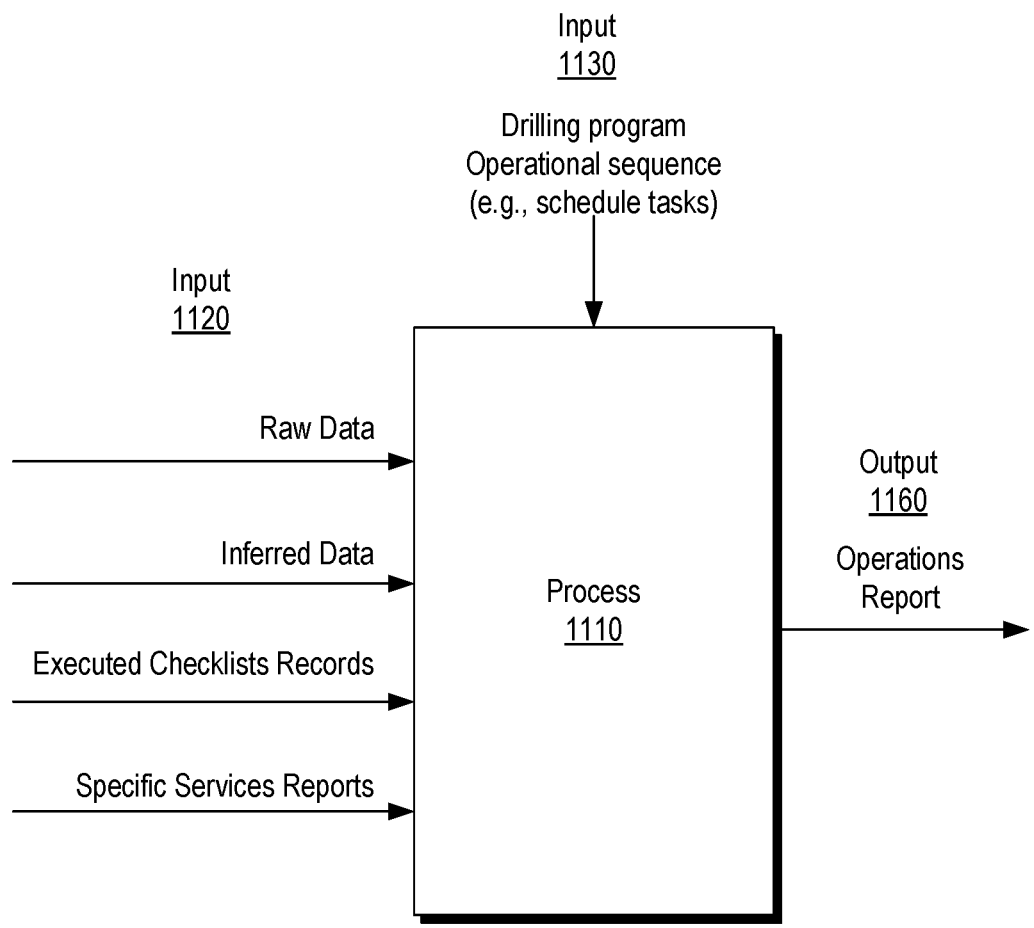
FIG. 11 illustrates an example of a system.
Figure 11:
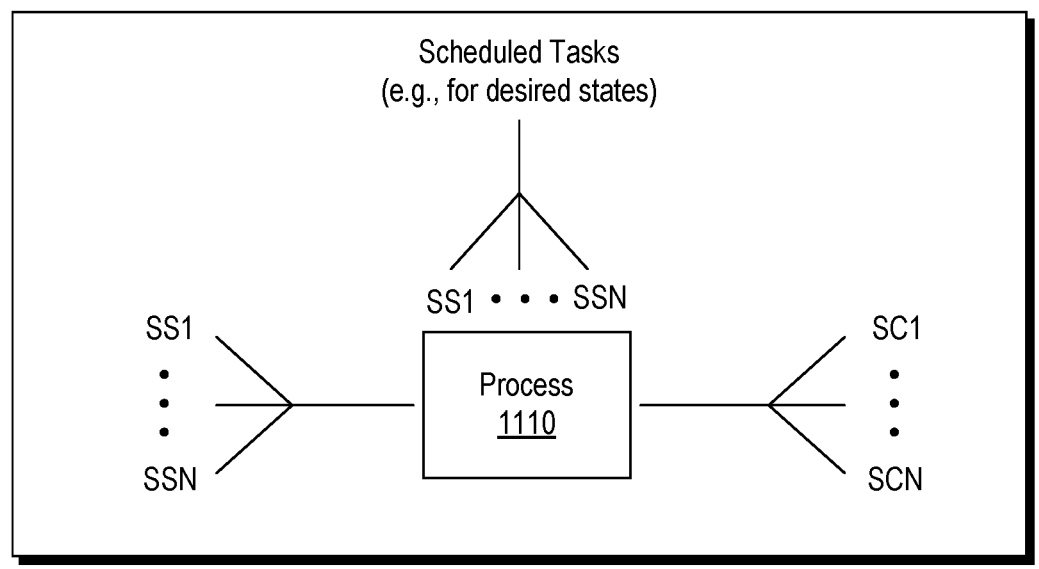

FIG. 11 shows an example of a process block 1110 that can receive input 1120, input 1130 and generate output 1160. As an example, the input 1120 can include input such as, for example, one or more of raw data, inferred data, executed checklists records, specific services reports, etc. As an example, the input 1130 can include, for example, drilling program information such as, for example, an operational sequence that may be in the form of scheduled tasks. In such an example, an operational sequence can include various operations that may occur at least in part concurrently with respect to time and various operations that may occur sequentially with respect to time. In the example of FIG. 11, the output 1160 can be an operations report. As an example, a system such as, for example, the system 900 may be utilized at least in part to perform one or more actions of the process block 1110. For example, the system 970 may include features sufficient to perform the functions of the process block 1110 of the example of FIG. 11.

FIG. 11 also shows an example of an arrangement where the process block 1110 can receive information from one or more subsystems (e.g., SS1 to SSN) of a wellsite system, where the process block 1110 can receive one or more subsystem portions associated with scheduled tasks and where the process block 1110 can output one or more reports to one or more service entities, which may be service companies (e.g., SC1 to SCN). In such an example, one or more reports may be tailored based at least in part on context and/or role of an entity, which may be, for example, a service provider that provides a service and/or equipment for a wellsite.

As an example, the output 1160 can be daily operations reports that may, for example, be automatically generated using natural language processing (NLP) algorithms given certain inputs.

As an example, such an approach may reduce time and/or resource demands as to creation of daily operations reports, which can be a time consuming activity for various actors in well operations. As an example, NLP may reduce the time of report generating activities. As an example, the process block 1110 may include a NLP engine that can receive information for creation of daily reports where the process block 1110 can be automatically triggered, for example, for creation of daily reports that are to be validated by their respective authors.

As an example, the process block 1110 may be a framework for representing well construction knowledge in a manner that allows reasoning and transforming sensor information (e.g., raw data, etc.) into actionable decisions at least in part via merging inferred outcomes with text or speech based information, for example, to produce a natural language based result that can be consumed by a human.

As an example, NLP may include artificial intelligence and computational linguistics. As an example, it may be possible for a domain expert to deduce the gist of well operations that have taken place by analyzing raw and inferred data streams gathered at a rig site. By raw data, such data can include data from surface sensors and/or downhole sensors. As an example, various available inputs, such as one or more plan activities for a period, one or more reports produced by one or more service providers involved in operations, and a record of one or more executed checklists from one or more different well construction actors may be utilized in producing a detailed report of operations.

As an example, NLP can be utilized to automatically create human readable reports that summarize daily operations. For example, consider a system that can utilize algorithms for automatic summarization, natural language understanding, natural language generation, and relationship extraction to build the process block 1110 in the example of FIG. 11 to transform different inputs into a report or reports.

As an example, one or more NLP algorithms related to machine translations may be implemented to, for example, cover operations in different parts of the world where contractual obligations may exist to provide reports in different languages. As an example, one or more users may request reports in a particular language.

As an example, NLP may be utilized as part of record and report compliance. For example, consider one or more inputs as to standard working instructions, standard operating procedures, or one or more other specific contractual instructions that can be utilized by the process block 1110 to generate one or more reports (e.g., optionally one or more "records"). As an example, an agency that may be, for example, a government agency may provide a format, specifications, etc. as to information and form that can be received by the process block 1110 such that the process block 1110 can generate acceptable information for that government agency. Such an approach may reduce risks as to compliance.

As an example, a system can include one or more entity specific plug-ins that may, for example, generate reports specific for an entity. For example, a service company plug-in may be available that can be a back-end, front-end or other type of plug-in that can, for example, format information in a particular manner where at least a portion of the information is generated, for example, using natural language processing.

As an example, a drilling framework can include report generation features. For example, the drilling framework 301 of FIGS. 3 and 4, the drilling framework 620 of FIG. 6, etc. may include a natural language processing-based report generator and/or may include features that can access a remote natural language processing framework (e.g., a server-based, a cloud-based, etc. framework).

As an example, the system 770 of FIG. 7 may include a natural language processing-based report generator and/or may include features that can access a remote natural language processing framework (e.g., a server-based, a cloud-based, etc. framework), which may be, for example, provided as a remote service. As an example, a report generator may be locally situated such that information acquired at a wellsite can be received and analyzed in real-time (e.g., near real-time). In such an example, the various roles and associated operations at the wellsite can be contextual. As an example, a state-based, contextual report generator may be available or accessible at a wellsite such that individuals performing roles according to one or more scheduled tasks can be informed as to states, progress, issues, etc. via language that is, for example, tailored to individual types of roles.

Figure 12:
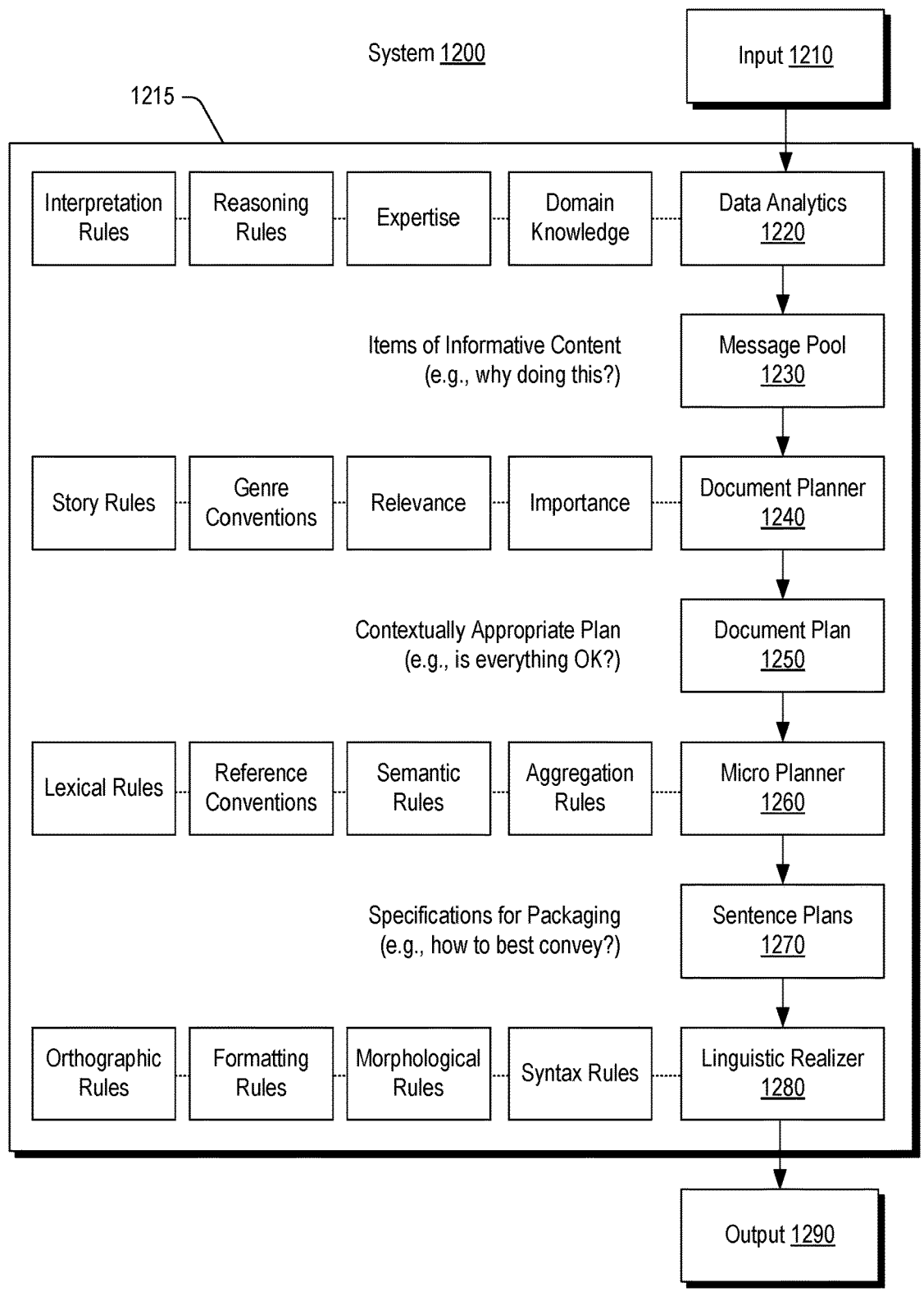
FIG. 12 illustrates an example of a system.

FIG. 12 shows an example of a system 1200 that includes a natural language processing (NLP) engine 1215 that can receive input per an input block 1210 and that can generate output per an output block 1290.

As shown in the example of FIG. 12, the NLP engine 1215 includes a data analytics block 1220, a message pool block 1230, a document planner block 1240, a document plan block 1250, a micro planner block 1260, a sentence plans block 1270, and a linguistic realizer block 1280.

As an example, an NLP engine may include an analyst portion that acts as an analyst, making sense of data from which it draws conclusions; and a narrator portion that acts as a narrator, communicating those conclusions.

As an example, an analyst portion can be a data analytics component or components. For example, knowledge and expertise may be applied to situations to make sense of data. As an example, in various domains, past experience can be compared with real time inputs, for example, to understand scenarios, states, etc. and, for example, to make decisions about what to do next. An NLP engine can capture and embody such skills in the form of algorithms (e.g., models, etc. that can be used to understand states, state transitions, outcomes, etc.). Such models may be based on human and/or machine behaviors. Given such models, an NLP engine can replicate (e.g., approximate) such behaviors.

As an example, a narrator component can provide for packaging results based at least in part on data analytics. As an example, a report may be "packaged results". An NLP engine can make use of codified knowledge of how language works, for example, from how texts can be organized at a high level, down to the specific words that can be used to appropriately communicate concepts to a given audience. A narrator component can be a link between data analytics and human-like communication.

As an example, a reporting component of a system may implement at least in part a natural language or natural languages. As an example, an NLP algorithm can be based on machine learning such as, for example, statistical machine learning.

As an example, one or more algorithms can take as input a large set of features that are generated from input data. As an example, a system can implement one or more statistical models, which may make soft, probabilistic decisions based on attaching real-valued weights to one or more input feature. Such models may express the relative certainty of different possible answers and may present options and/or a most probable answer.

As an example, a reporting component of a system can include features that can implement lexical semantics and/or compositional semantics. As an example, the system 1200 can include features for narrative understanding. As an example, the system 1200 can include artificial intelligence features.

In the example of FIG. 12, the system 1200 may include one or more components that can implement an analysis and/or interpretation engine and/or delivery engine that delivers information. For example, consider the ARRIA framework (ARRIA NLG plc, London, UK) as a natural language generation framework. In such an example, data can be integrated from various sources, which may be structured and/or unstructured (e.g., consider SQL, blob, etc.).

As an example, a system can include a natural language framework that includes an engine that carries out data analytics and interpretation. In such an example, various sources of data can be received and processed to extract and/or deduce facts, insights, etc., which may be germane to an ongoing operation. Such an approach may generate one or more reports.

As an example, the system 1200 may be included in or operatively coupled to a system such as the system 900 of FIG. 9. In such an example, information may be disambiguated with respect to human understanding. For example, a number may be just a number, however, when placed into a proper context in a sentence or phrase, the number may be disambiguated for a human in that the human can understand the import of the number. As information associated with a drilling operation may be quite complex, opportunities exist to disambiguate pieces of information. As an example, the system 900 can include natural language processing (NLP) features to generate language based on one or more pieces of information where such generated language may facilitate planning, execution, etc. of one or more tasks, which may be scheduled tasks. As an example, generated language may convey information germane to a workflow, workflows, a schedule, schedules, etc. Where various individuals receive generated language, collaboration as to tasks may be facilitated, which may, for example, help keep operations on schedule and/or help to reschedule one or more operations (e.g., tasks, etc.).

As an example, a system may provide for disambiguation. For example, where one or more conflicts may exist between activities reported or detected from different input channels by a processing engine, these one or more conflicts may be automatically tagged by the processing engine. In such an example, a user may decide (e.g., manually, semi-automatically, etc.) what to report. As an example, a conflict from inputs to an engine may be due to services companies presenting reports lacking accurate time information, inference algorithms working outside design assumptions, etc.

As an example, as to completion of a report, a processing engine may recognize one or more gaps in time (e.g., a time interval, etc.) where no particular operations activity has been identified. In such an example, the processing engine may flag the one or more gaps and, for example, a user may enter (e.g., manually, semi-automatically, etc.) information as to one or more types of missing operations activity. As an example, a gap in input may be caused by one or more faults in raw data acquisition, faults in inference calculations, services companies report not filled in properly, etc.

Figure 13:
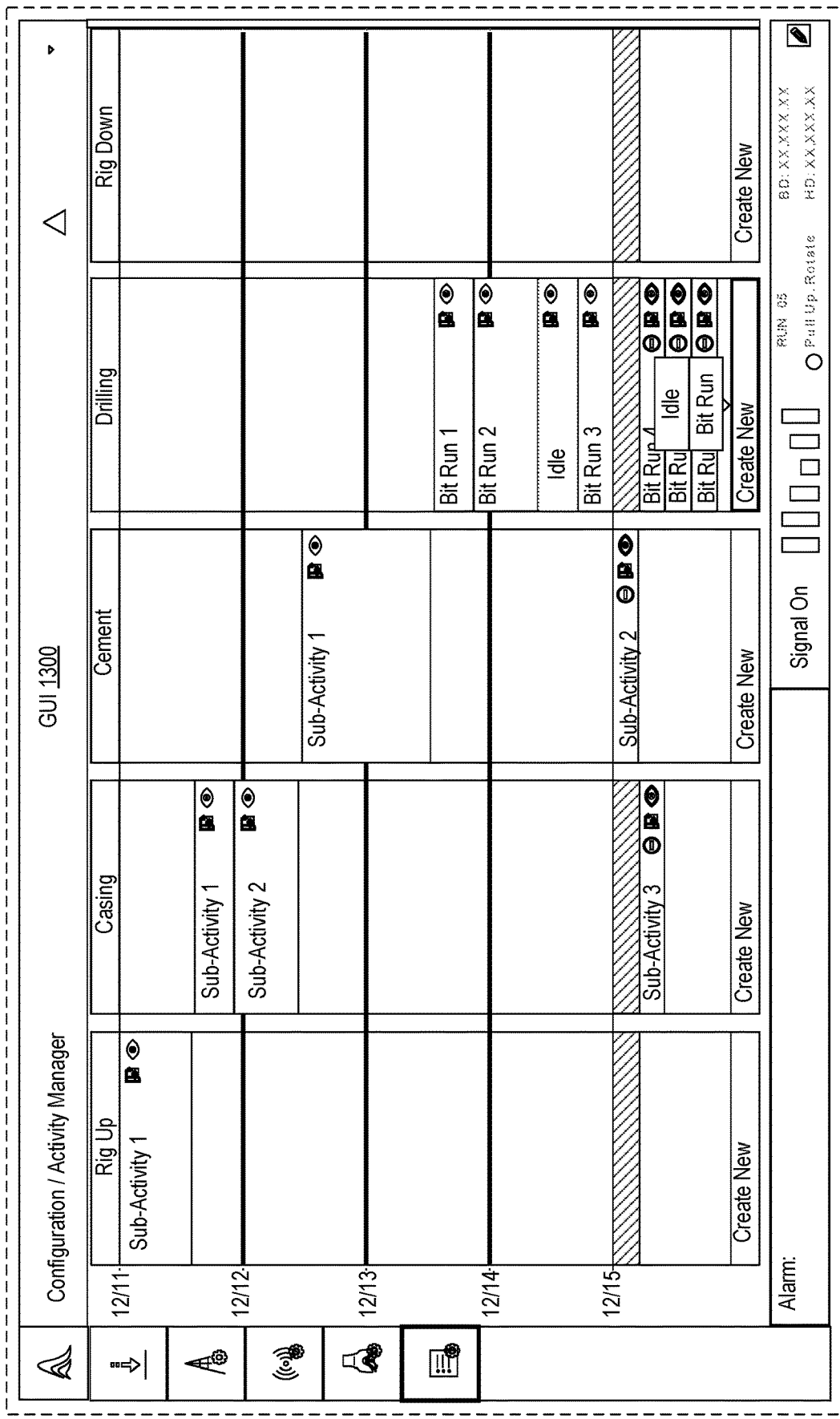
FIG. 13 illustrates an example of a graphical user interface.

FIG. 13 shows an example of a graphical user interface (GUI) 1300 that includes various subsystem tasks as may be part of a well plan. For example, a rig up subsystem, a casing subsystem, a cement subsystem, a drilling subsystem and a rig down subsystem are illustrated as some possible examples of subsystems that can include associated tasks. As shown in the example of FIG. 13, the GUI 1300 includes a timeline, which can be incremented by minute, hour, day, etc. In the example of FIG. 13, the GUI 1300 can be render information as to scheduled tasks that are organized by subsystem type where a scheduled task may aim to achieve a desired state of wellsite equipment.

In the example of FIG. 13, the various tasks are shown as Sub-Activities and as other types of tasks (e.g., Idle, Bit Run, etc.), which may be considered to be Sub-Activities. As an example, graphical controls can allow for addition of one or more new activities (e.g., scheduling of new tasks). As an example, graphical controls can allow for rescheduling one or more tasks.

In the example of FIG. 13, a dashed box represents a display device onto which the GUI 1300 can be rendered. For example, consider a flat panel display, which may be, for example, a touchscreen display.

Figure 14:
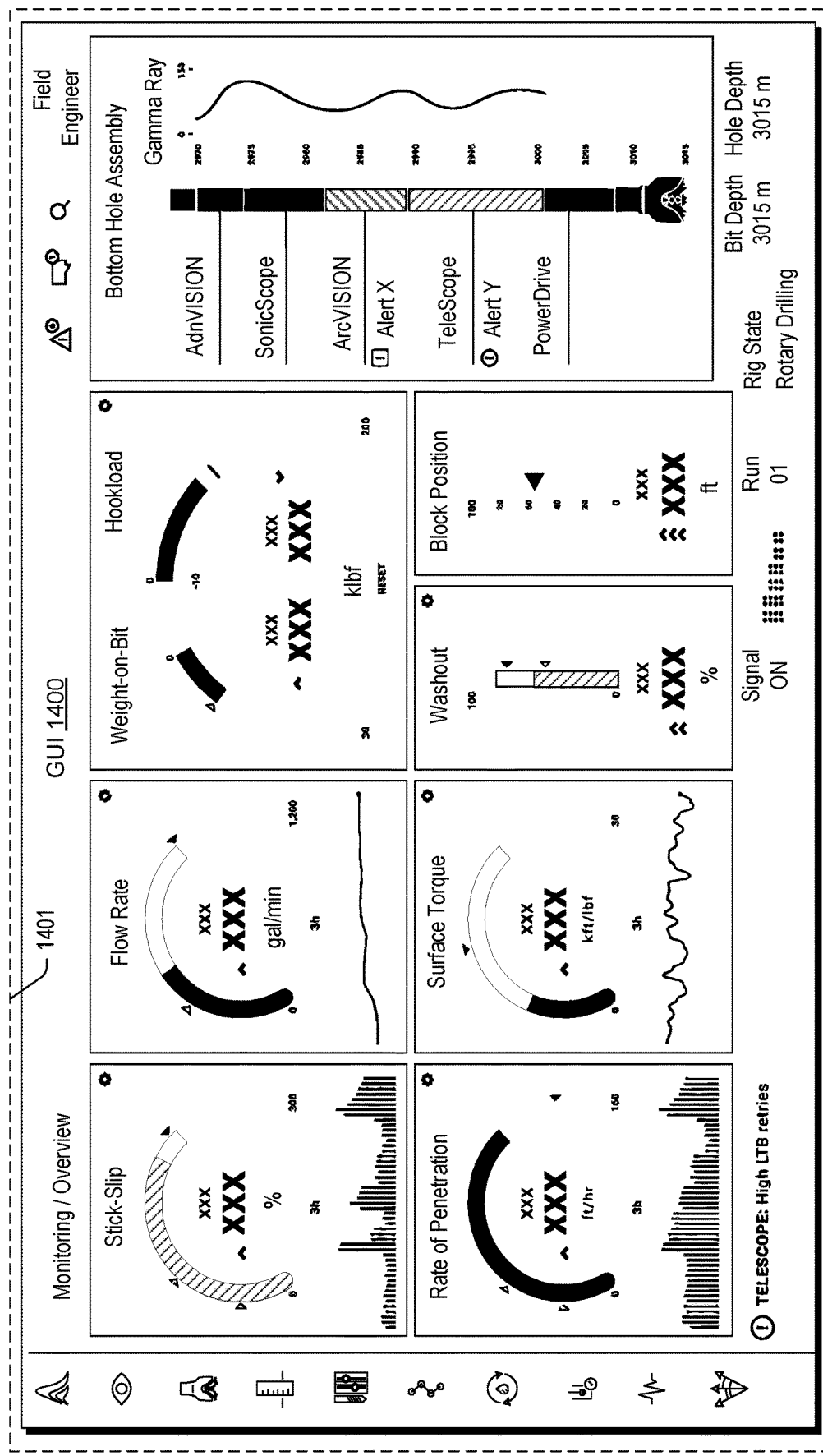
FIG. 14 illustrates an example of a graphical user interface.

FIG. 14 shows an example of a GUI 1400 that is rendered to a display device 1401, represented by a dashed box. For example, consider a flat panel display, which may be, for example, a touchscreen display.

In the example of FIG. 14, the GUI 1400 may be an operational dashboard where the state of one or more pieces of equipment, operations, etc. may be rendered visually, for example, via graphics and/or numbers. As an example, various colors may be utilized to convey state information. As an example, audio may be associated with the GUI 1400 and changes thereto, etc. For example, where a parameter reaches a limit, a color change may occur to a graphic of the display device 1401 and an audio alarm may be rendered via one or more speakers.

Figure 15:
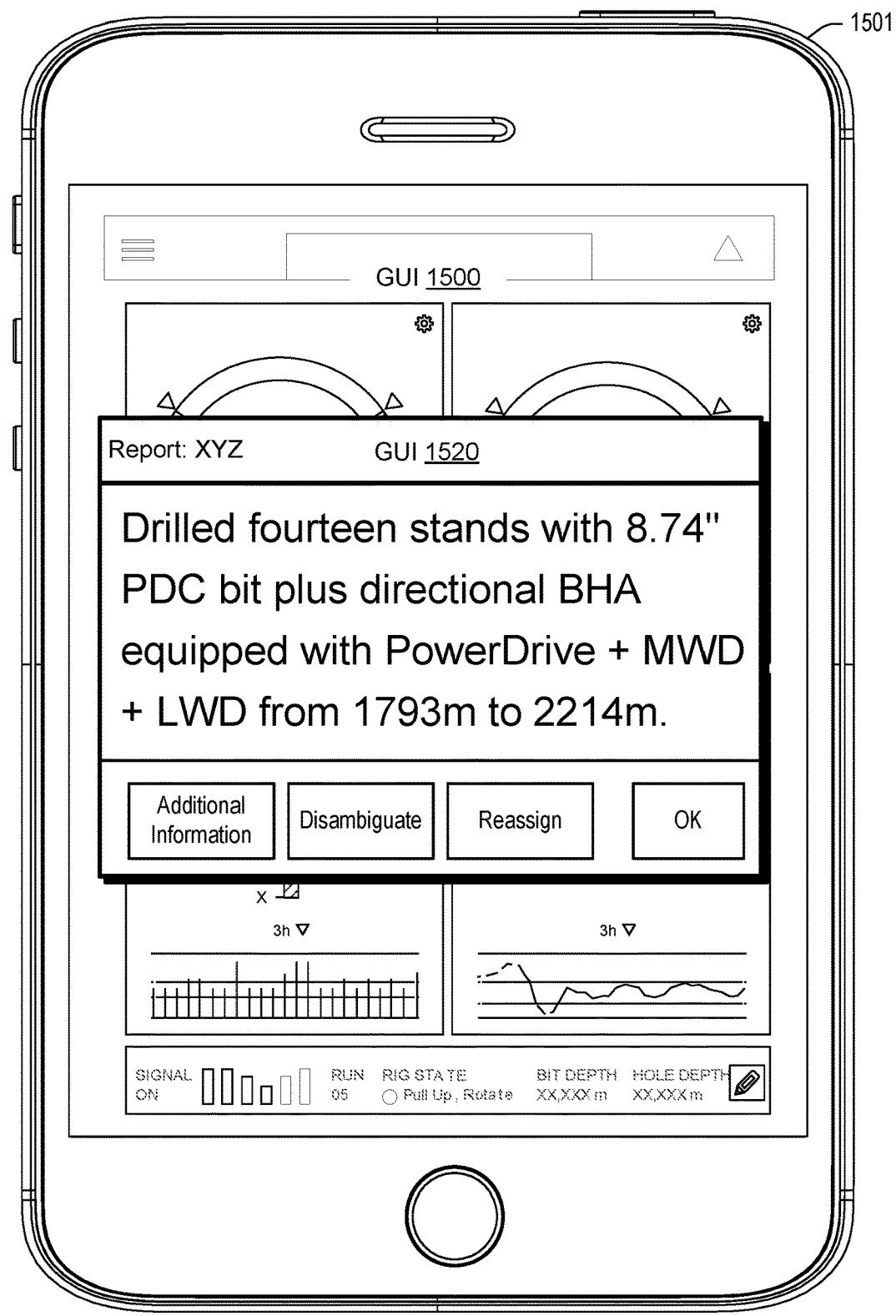
FIG. 15 illustrates an example of a graphical user interface.

FIG. 15 shows an example of a GUI 1500 rendered to a display device 1501, which may be, for example, a smart phone, a tablet, etc. As shown, the GUI 1500 can include a plurality of individual GUIs that may convey state information or information germane to operational states as well as, for example, a report GUI 1520 that provides a report in a language tailored to the individual in possession of the display device 1501, which may correspond to a particular role (e.g., as set forth in a well plan, etc.). In the example of FIG. 15, the GUI 1500 can include "dials" (e.g., arcuate and/or linear) and tracks with respect to time (e.g., bars, plots, etc.). As an example, the display device 1501 can be a touchscreen display device such that a user may utilize touch (e.g., finger, multi-finger, gestures, etc.) to navigate and/or command the GUI 1500.

As an example, a report may be generated for a role on a daily basis where the report is based at least in part on state information and at least in part on context. As an example, such a report may be transmitted to a device associated with the role (e.g., via an identifier, network address, etc.). Such a report may be rendered to a display operatively coupled to the device or, for example, a display that is part of the device. In such a manner, an individual can view the report and understand the status of one or more operations that may pertain to a well plan.

In the example of FIG. 15, the report corresponds to the "third report" as mentioned above, which may be for a toolpusher who may be interested in the process of drilling and the efficiency of the rig.

In the example of FIG. 15, the GUI 1520 may include one or more graphical controls. For example, consider an additional information button, a disambiguate button, a reassign button and an OK button. In such an example, the GUI 1520 may highlight the additional information button to indicate that input of additional information may help to clarify language. For example, where a system such as the system 1200 of FIG. 12 (e.g., optionally implemented in a system such as the system 900 of FIG. 9) can determine that one or more additional pieces of information may facilitate language realization, an additional information request may be transmitted and/or be noted in the form of a highlighted graphic, etc. on a GUI. Upon actuation of such a graphic or in response to a request, additional information may be input and/or one or more sources of additional information identified. A delay may occur as a system receives and processes such additional information where after such a delay, a reformulated message may appear, for example, with greater clarity, confidence, etc. As to a disambiguate control, actuation of such a control may trigger reassessment of language presented. For example, a user may not comprehend a message or a message may be amenable to more than one interpretation. In such an example, the disambiguate control may be actuated and trigger a reassessment where one or more aspects are adjusted in an effort to provide a new message that is clearer. For example, where a system can operate in different modes such as a fast mode and a slow mode, a disambiguate request may reprocess information in a slow mode that may involve more computations, accessing more rules, data, etc. As an example, a system may transmit a premise to a device for rendering to a display such that a user can review the premise and, for example, accept, reject or modify it. Such an approach may be part of a disambiguation process where a system can learn based on user response to a premise query. As to the reassign control, this may allow a user to reassign (e.g., or transfer) a task to another individual. For example, where a person is off his shift early and the message arrives, the person may actuate the reassign control to direct the message to the person on the next shift. As an example, the OK control may be actuated and may be taken as input as to confidence in, acceptability of, etc. the message rendered to a display.

As an example, where an individual is performing manual work and her hands are unavailable to view a GUI rendered to a display, an audio option can exist for rendering a message via headphones, a headset, etc. In such an example, input may be via a microphone (e.g., a headset microphone).

Figure 16:
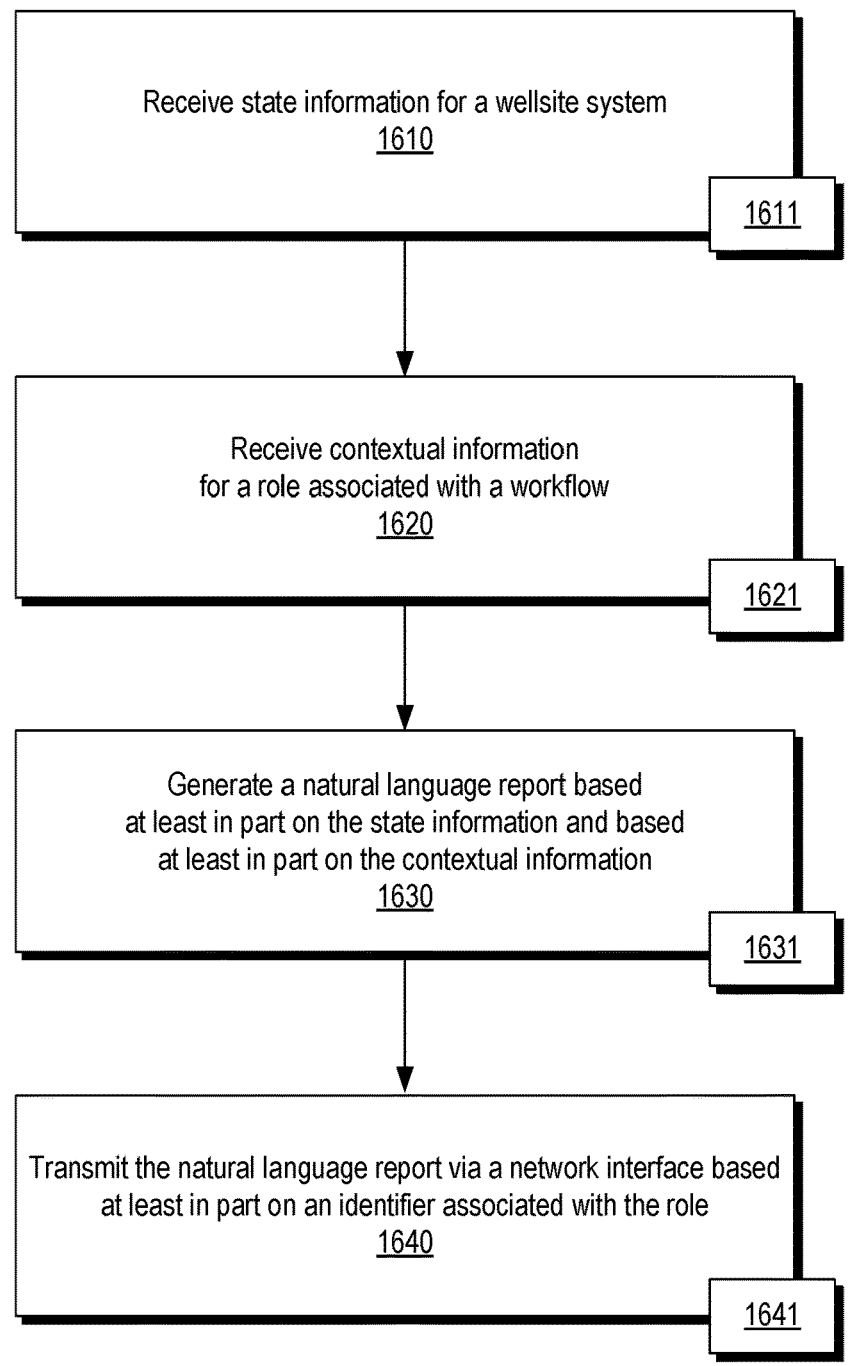
FIG. 16 illustrates an example of a method.

FIG. 16 shows an example of a method 1600 that includes a reception block 1610 for receiving state information for a wellsite system; a reception block 1620 for receiving contextual information for a role associated with a workflow (e.g., scheduled tasks, etc.); a generation block 1630 for generating a natural language report based at least in part on the state information and based at least in part on the contextual information; and a transmission block 1640 for transmitting the natural language report via a network interface based at least in part on an identifier associated with the role.

The method 1600 is shown in FIG. 16 in association with various computer-readable media (CRM) blocks 1611, 1621, 1631 and 1641. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1600. As an example, a computer-readable medium (CRM) may be a computer-readable storage medium that is non-transitory and not a carrier wave. As an example, the blocks 1611, 1621, 1631 and 1641 may be provided as one or more modules, for example, such as the one or more modules and/or instructions 1702 of the system 1700 of FIG. 17.

As an example, a method can include receiving state information for a wellsite system; receiving contextual information for a role associated with a workflow; generating a natural language report based at least in part on the state information and based at least in part on the contextual information; and transmitting the natural language report via a network interface based at least in part on an identifier associated with the role. In such an example, the method can include receiving the natural language report via a network interface of a device and rendering the natural language report to a display of the device.

As an example, state information can include data acquired via one or more sensors of the wellsite system. As an example, state information can correspond to a subsystem of a wellsite system where, for example, a role may be associated with the subsystem.

As an example, a method can include generating a natural language report based at least in part on state information and based at least in part on contextual information according to a time schedule.

As an example, a method can include receiving state information for a wellsite system; receiving contextual information for a role associated with a workflow; generating a natural language report based at least in part on the state information and based at least in part on the contextual information; and transmitting the natural language report via a network interface based at least in part on an identifier associated with the role and can include receiving contextual information for a different role associated with a workflow and generating a different natural language report based at least in part on the state information and based at least in part on the contextual information for the different role.

As an example, a method can include receiving two sets of contextual information and generating two different natural language reports based at least in part on a common portion of the state information.

As an example, an identifier can be associated with a particular language where, for example, a natural language report is generated in the particular language.

As an example, a method can include generating a natural language report by transmitting information to a remote natural language processing engine and, responsive to the transmitting, receiving the natural language report.

As an example, a wellsite system can include a natural language processing engine where, for example, a method can include generating a natural language report utilizing the natural language processing engine.

As an example, a method can include transmitting at least a portion of state information via a network interface based at least in part on an identifier associated with a role where the portion of the state information is renderable via a graphical user interface and where the natural language report is renderable as an overlay on the graphical user interface. For example, a user may carry a device that includes a display that can have rendered thereto state information (e.g., GUI gauges, etc.) and a natural language report. Such an approach may allow a user to view one or more renderings in a desired manner (e.g., simultaneously, sequentially, etc.).

As an example, a role can be a driller, a service provider, a driller as a service provider, etc. As an example, a role can be a governmental authority. For example, a role may be an agency that is expected to receive one or more reports associated with a well plan, equipment operations, production of fluid, injection of fluid, handling of fluid, etc.

As an example, a system can include one or more processors; a network interface operatively coupled to the one or more processors; memory operatively coupled to the one or more processors; and processor-executable instructions stored in the memory and executable by at least one of the processors to instruct the system to receive state information for a wellsite system; receive contextual information for a role associated with a workflow; generate a natural language report based at least in part on the state information and based at least in part on the contextual information; and transmit the natural language report via the network interface based at least in part on an identifier associated with the role. In such an example, the state information can include data acquired via one or more sensors of the wellsite system. As an example, state information can correspond to a subsystem of a wellsite system where, for example, a role is associated with the subsystem.

As an example, a system can include one or more processors; a network interface operatively coupled to the one or more processors; memory operatively coupled to the one or more processors; and processor-executable instructions stored in the memory and executable by at least one of the processors to instruct the system to receive state information for a wellsite system; receive contextual information for a role associated with a workflow; generate a natural language report based at least in part on the state information and based at least in part on the contextual information; transmit the natural language report via the network interface based at least in part on an identifier associated with the role; receive contextual information for a different role associated with a workflow; and generate a different natural language report based at least in part on the state information and based at least in part on the contextual information for the different role.

As an example, one or more computer-readable storage media can include computer-executable instructions executable to instruct a computing system to: receive state information for a wellsite system; receive contextual information for a role associated with a workflow; generate a natural language report based at least in part on the state information and based at least in part on the contextual information; and transmit the natural language report via the network interface based at least in part on an identifier associated with the role. In such an example, instructions may be included to receive contextual information for a different role associated with a workflow and to generate a different natural language report based at least in part on the state information and based at least in part on the contextual information for the different role.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 17:
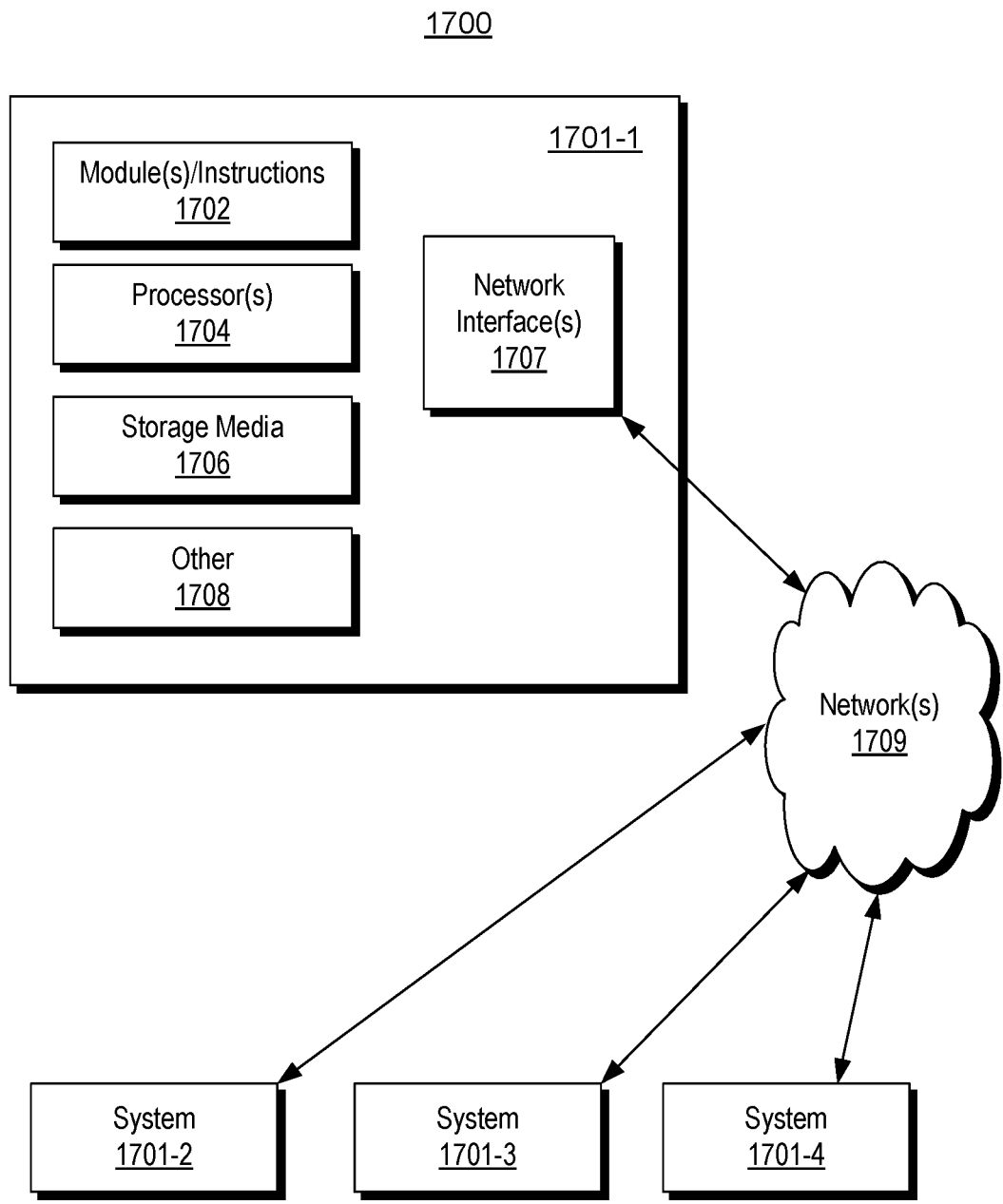
FIG. 17 illustrates examples of computing and networking equipment.

In some embodiments, a method or methods may be executed by a computing system. FIG. 17 shows an example of a system 1700 that can include one or more computing systems 1701-1, 1701-2, 1701-3 and 1701-4, which may be operatively coupled via one or more networks 1709, which may include wired and/or wireless networks.

As an example, a system can include an individual computer system or an arrangement of distributed computer systems. In the example of FIG. 17, the computer system 1701-1 can include one or more modules 1702, which may be or include processor-executable instructions, for example, executable to perform various tasks (e.g., receiving information, requesting information, processing information, simulation, outputting information, etc.).

As an example, a module may be executed independently, or in coordination with, one or more processors 1704, which is (or are) operatively coupled to one or more storage media 1706 (e.g., via wire, wirelessly, etc.). As an example, one or more of the one or more processors 1704 can be operatively coupled to at least one of one or more network interface 1707. In such an example, the computer system 1701-1 can transmit and/or receive information, for example, via the one or more networks 1709 (e.g., consider one or more of the Internet, a private network, a cellular network, a satellite network, etc.).

As an example, the computer system 1701-1 may receive from and/or transmit information to one or more other devices, which may be or include, for example, one or more of the computer systems 1701-2, etc. A device may be located in a physical location that differs from that of the computer system 1701-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1706 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 18:
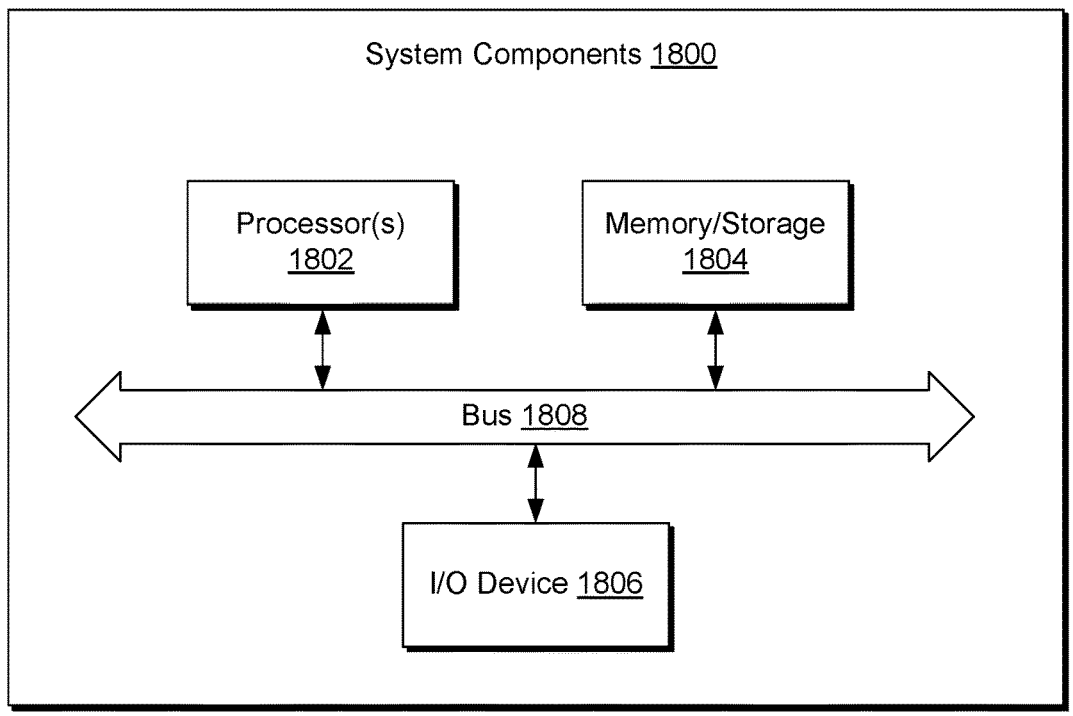
FIG. 18 illustrates example components of a system and a networked system.
Figure 18:
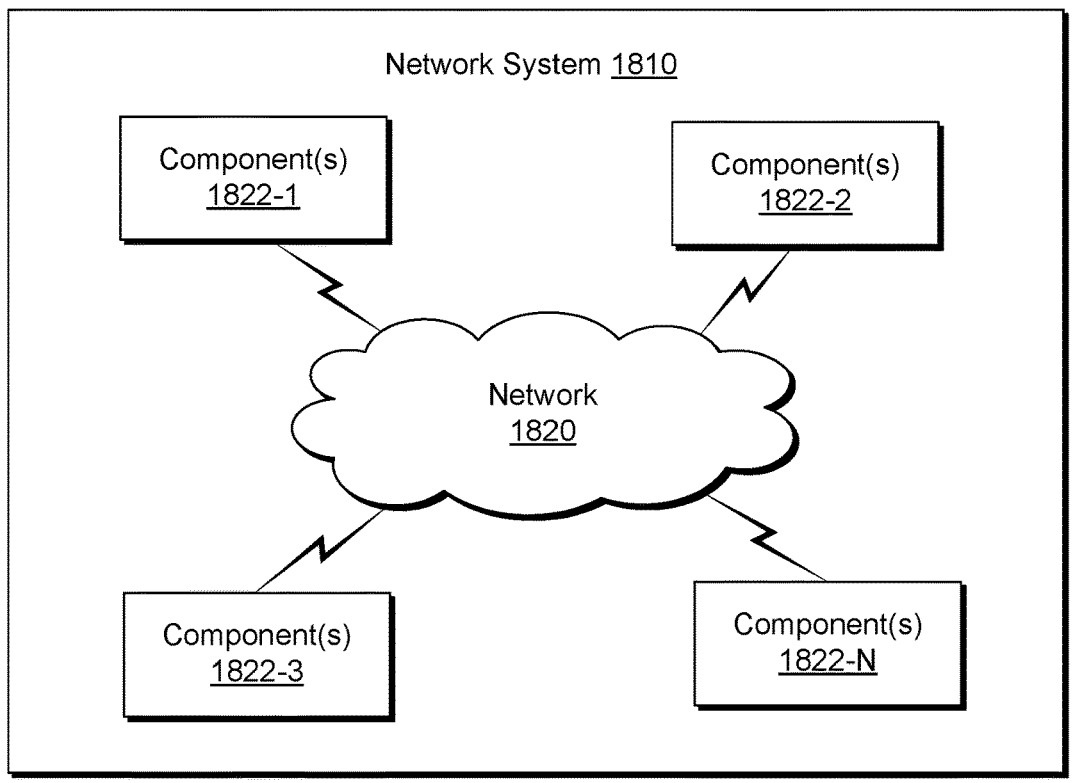

FIG. 18 shows components of a computing system 1800 and a networked system 1810. The system 1800 includes one or more processors 1802, memory and/or storage components 1804, one or more input and/or output devices 1806 and a bus 1808. According to an embodiment, instructions may be stored in one or more computer-readable media (e.g., memory/storage components 1804). Such instructions may be read by one or more processors (e.g., the processor(s) 1802) via a communication bus (e.g., the bus 1808), which may be wired or wireless. The one or more processors may execute such instructions to implement (wholly or in part) one or more attributes (e.g., as part of a method). A user may view output from and interact with a process via an I/O device (e.g., the device 1806). According to an embodiment, a computer-readable medium may be a storage component such as a physical memory storage device, for example, a chip, a chip on a package, a memory card, etc.

According to an embodiment, components may be distributed, such as in the network system 1810. The network system 1810 includes components 1822-1, 1822-2, 1822-3, . . . 1822-N. For example, the components 1822-1 may include the processor(s) 1802 while the component(s) 1822-3 may include memory accessible by the processor(s) 1802. Further, the component(s) 1822-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
   receiving state information for a wellsite system;
   receiving contextual information for a role associated with a workflow, wherein the role comprises a drilling-related role, wherein the workflow comprises a drilling workflow;
   generating a natural language report using a natural language processing engine based at least in part on the state information and based at least in part on the contextual information, wherein the natural language report comprises a natural language description of drilling equipment and is indicative of a distance drilled; and
   transmitting the natural language report via a network interface based at least in part on an identifier associated with the role.

2. The method of claim 1 comprising receiving the natural language report via a network interface of a device and rendering the natural language report to a display of the device.

3. The method of claim 1 wherein the state information comprises data acquired via one or more sensors of the wellsite system.

4. The method of claim 1 wherein the state information corresponds to a subsystem of the wellsite system and wherein the role is associated with the subsystem.

5. The method of claim 1 wherein the generating occurs according to a time schedule.

6. The method of claim 1 comprising receiving contextual information for a different role associated with a workflow and generating a different natural language report based at least in part on the state information and based at least in part on the contextual information for the different role.

7. The method of claim 1 comprising receiving two sets of contextual information and generating two different natural language reports based at least in part on a common portion of the state information.

8. The method of claim 1 wherein the identifier is associated with a particular language and wherein the natural language report is generated in the particular language.

9. The method of claim 1 wherein the natural language processing engine is remote, wherein the generating comprises transmitting information to the remote natural language processing engine and, responsive to the transmitting, receiving the natural language report.

10. The method of claim 1 wherein the wellsite system comprises the natural language processing engine and wherein the generating comprises utilizing the natural language processing engine.

11. The method of claim 1 comprising transmitting at least a portion of the state information via the network interface based at least in part on the identifier associated with the role wherein the portion of the state information is renderable via a graphical user interface, wherein the natural language report is renderable as an overlay on the graphical user interface, wherein the graphical user interface comprises a graphic actuatable to transmit a request to disambiguate at least a portion of the natural language report, and, responsive to receiving a disambiguation request, generating a reassessed natural language report.

12. The method of claim 1 wherein the role comprises a driller, a service provider, or a governmental authority.

13. The method of claim 1, comprising receiving a request to disambiguate the transmitted natural language report with respect to a number and, responsive to the request, generating a reassessed natural language report using the natural language processing engine to place the number into at least a phrase, and transmitting the reassessed natural language report.

14. A system comprising:
   one or more processors;
   a network interface operatively coupled to the one or more processors;
   memory operatively coupled to the one or more processors; and processor-executable instructions stored in the memory and executable by at least one of the processors to instruct the system to receive state information for a wellsite system;

receive contextual information for a role associated with a workflow, wherein the role comprises a drilling-related role and wherein the workflow comprises a drilling workflow;

generate a natural language report using a natural language processing engine based at least in part on the state information and based at least in part on the contextual information, wherein the natural language report comprises a natural language description of drilling equipment and is indicative of a distance drilled; and transmit the natural language report via the network interface based at least in part on an identifier associated with the role.

15. The system of claim 14 wherein the state information comprises data acquired via one or more sensors of the wellsite system.

16. The system of claim 14 wherein the state information corresponds to a subsystem of the wellsite system and wherein the role is associated with the subsystem.

17. The system of claim 14 comprising processor-executable instructions stored in the memory and executable by at least one of the processors to instruct the system to receive contextual information for a different role associated with a workflow and to generate a different natural language report based at least in part on the state information and based at least in part on the contextual information for the different role.

18. One or more non-transitory computer-readable storage media comprising computer-executable instructions executable to instruct a computing system to:

receive state information for a wellsite system;

receive contextual information for a role associated with a workflow, wherein the role comprises a drilling-related role and wherein the workflow comprises a drilling workflow;

generate a natural language report using a natural language processing engine based at least in part on the state information and based at least in part on the contextual information, wherein the natural language report comprises a natural language description of drilling equipment and is indicative of a distance drilled; and transmit the natural language report via the network interface based at least in part on an identifier associated with the role.

19. The one or more non-transitory computer-readable storage media of claim 18 comprising computer-executable instructions executable to instruct a computing system to receive contextual information for a different role associated with a workflow and to generate a different natural language report based at least in part on the state information and based at least in part on the contextual information for the different role.

* * * * *